(12) United States Patent
Kusano et al.

(10) Patent No.: US 6,907,214 B2
(45) Date of Patent: Jun. 14, 2005

(54) TONER BOTTLE AND ELECTROPHOTOGRAPHIC APPARATUS USING THE SAME

(75) Inventors: Tetsuya Kusano, Shizuoka (JP); Seiji Terazawa, Shizuoka (JP); Kotaro Koide, Shizuoka (JP); Masashi Hasegawa, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 36 days.

(21) Appl. No.: 10/644,159

(22) Filed: Aug. 20, 2003

(65) Prior Publication Data

US 2004/0022559 A1 Feb. 5, 2004

Related U.S. Application Data

(62) Division of application No. 09/989,914, filed on Nov. 21, 2001, now Pat. No. 6,701,112.

(30) Foreign Application Priority Data

Nov. 24, 2000 (JP) ........................................ 2000-358555
Nov. 20, 2001 (JP) ........................................ 2001-355199

(51) Int. Cl.⁷ .............................................. G03G 15/00
(52) U.S. Cl. ................................ 399/262; 222/DIG. 1
(58) Field of Search ..................... 222/DIG. 1; 399/120, 399/262, 263

(56) References Cited

U.S. PATENT DOCUMENTS 5,655,195 A    8/1997  Ichikawa et al.
5,740,507 A    4/1998  Ichikawa et al.
5,857,129 A    1/1999  Harris
5,921,416 A    7/1999  Uehara
5,983,059 A   11/1999  Oka et al.
5,995,783 A   11/1999  Garcia et al.
6,134,411 A   10/2000  Meyer et al.

FOREIGN PATENT DOCUMENTS

| | | |
|---|---|---|
| EP | 0701181 | 3/1996 |
| JP | 07020705 | 1/1995 |
| JP | 10171227 | 6/1998 |
| JP | 11240066 | 9/1999 |

OTHER PUBLICATIONS

Copy of U.S. Appl. No. 368,411, filed Aug. 5, 1999.
Copy of U.S. Appl. No. 09/465,674, filed Dec. 17, 1999.
Copy of U.S. Appl. No. 09/907,326, filed Jul. 17, 2001.
Nov. 14, 2003 official Communication and European Search Report.

Primary Examiner—Hoang Ngo
(74) Attorney, Agent, or Firm—Cooper & Dunham LLP

(57) ABSTRACT

A hollow, cylindrical toner bottle of the present invention discharges toner stored therein when mounted to an electrophotographic image forming apparatus in a substantially horizontal position and then rotated about its axis. The toner bottle is made up of a mouth including a toner outlet and a cylindrical wall, and a body including a circumferential wall and a bottom. The mouth is formed by injection molding. The outer circumference of the toner outlet has circularity of 0.7 mm or below.

26 Claims, 23 Drawing Sheets

| | CIRCULARITY | COAXIALITY | TONER SCATTER RANK (g) |
|---|---|---|---|
| EX.1 | 0.15 | 0.2 | 5 |
| EX.2 | 0.15 | 0.6 | 5 |
| EX.3 | 0.35 | 0.9 | 3 |
| EX.4 | 0.35 | 0.5 | 4 |
| EX.5 | 0.15 | 0.9 | 3 |
| EX.6 | 0.65 | 0.4 | 3 |
| COMPARATIVE EX.1 | 0.75 | 0.9 | 1 |
| COMPARATIVE EX.2 | 0.75 | 0.4 | 2 |
| COMPARATIVE EX.3 | 0.75 | 1.2 | 1 |

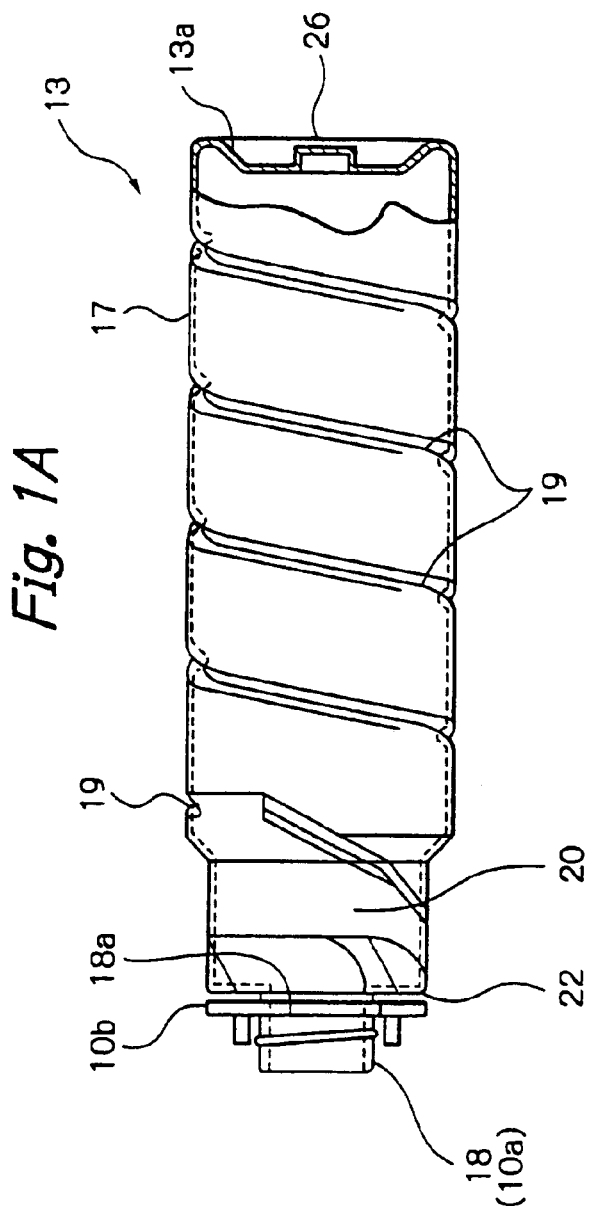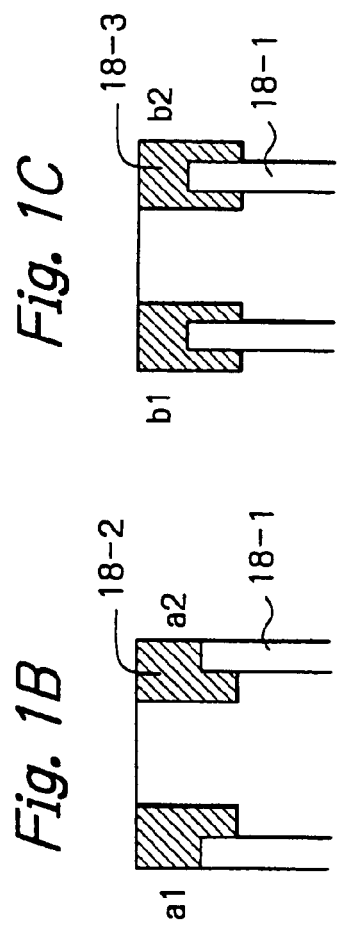

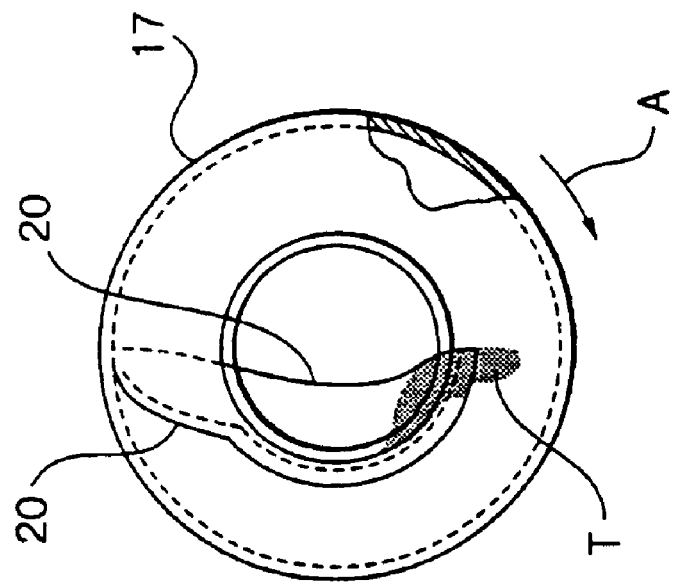
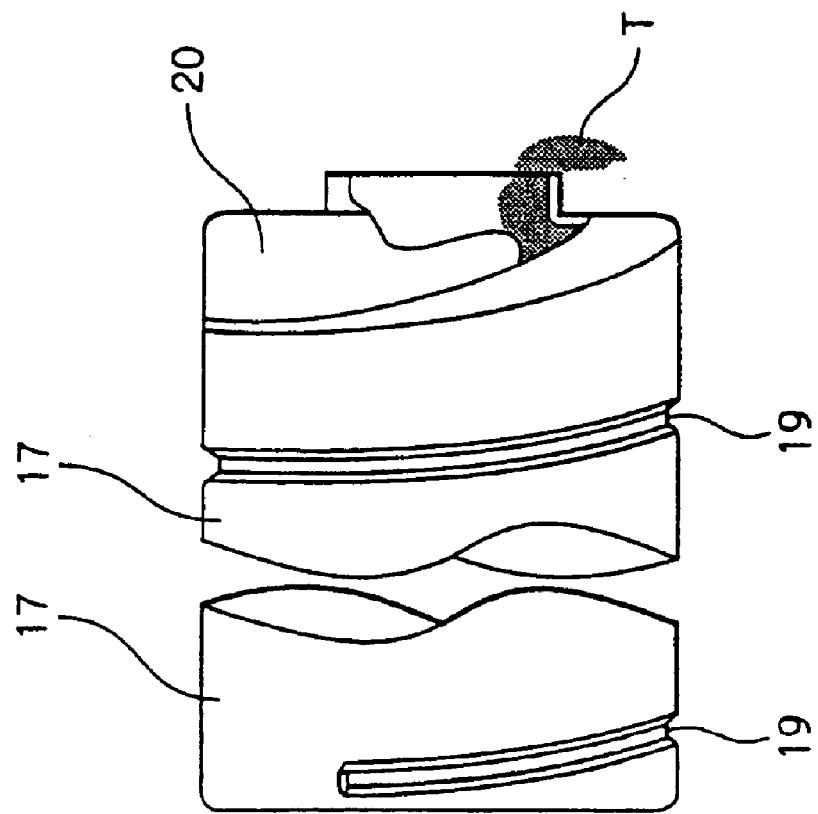

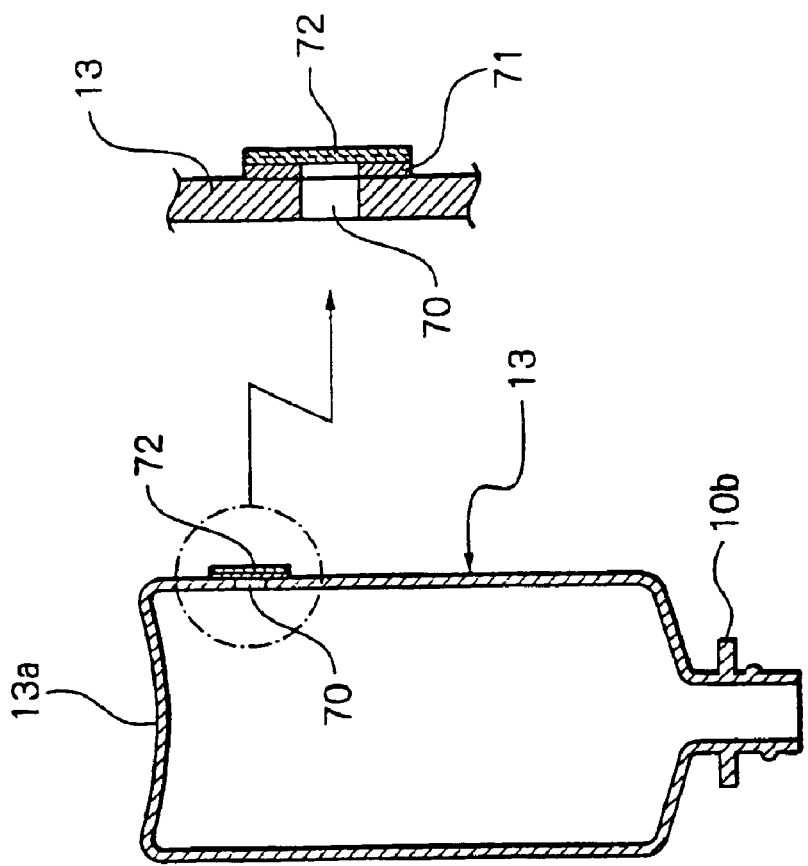
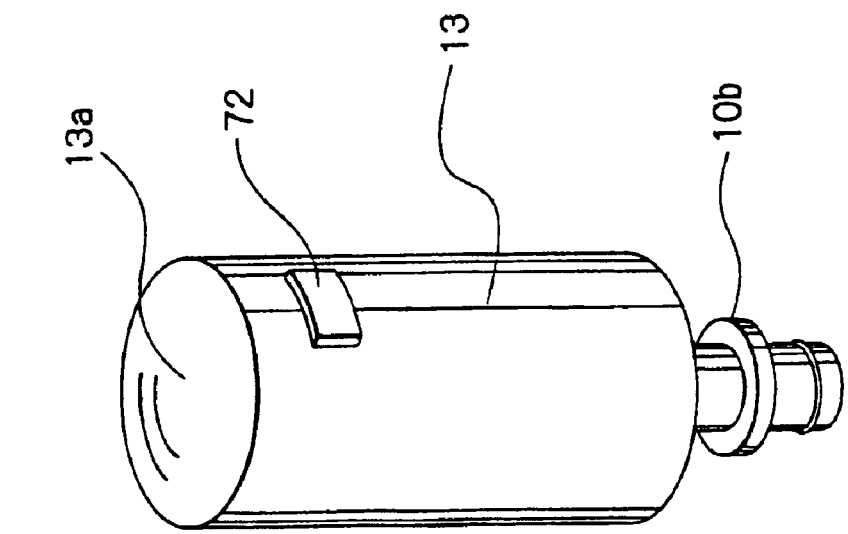

Fig. 32

|  | CIRCULARITY | COAXIALITY | TONER SCATTER RANK (g) |
|---|---|---|---|
| EX.1 | 0.15 | 0.2 | 5 |
| EX.2 | 0.15 | 0.6 | 5 |
| EX.3 | 0.35 | 0.9 | 3 |
| EX.4 | 0.35 | 0.5 | 4 |
| EX.5 | 0.15 | 0.9 | 3 |
| EX.6 | 0.65 | 0.4 | 3 |
| COMPARATIVE EX.1 | 0.75 | 0.9 | 1 |
| COMPARATIVE EX.2 | 0.75 | 0.4 | 2 |
| COMPARATIVE EX.3 | 0.75 | 1.2 | 1 |

Fig. 33

|  | CIRCULARITY | COAXIALITY | TONER SCATTER RANK (g) |
|---|---|---|---|
| EX.7 | 0.15 | 0.2 | 5 |
| EX.8 | 0.65 | 0.6 | 3 |
| EX.9 | 0.35 | 0.9 | 3 |

TONER BOTTLE AND ELECTROPHOTOGRAPHIC APPARATUS USING THE SAME

This application is a division of Ser. No. 09/989,914, filed Nov. 21, 2001, now U.S. Pat. No. 6,701,112.

BACKGROUND OF THE INVENTION

1. Field of the Invention

The present invention relates to a copier, fascimile apparatus, printer or similar electrophotographic image forming apparatus, a toner bottle to be packed with toner, or developer, for the apparatus, and a method of molding the toner bottle.

2. Description of the Background Art

An electrophotographic apparatus is conventional that forms a latent image on a photoconductive element, develops the latent image with charged toner, and then transfers the resulting toner image to a sheet. Usually, a toner container storing the toner is mounted to the apparatus. When the toner container runs out of the toner, it is replaced with a full toner container. Various kinds of toner containers have been proposed in the past, and each replenishes toner to the developing section of the apparatus in a particular manner.

As for a mechanism for discharging toner, toner containers are generally classified into two types, i.e., one that has agitating and discharging means thereinside and one that does not include such means, but is rotatable about its axis.

Japanese Patent Laid-Open Publication No. 7-20705, for example, discloses a rotation type of toner bottle to be mounted to the apparatus in a horizontal position. The toner bottle is rotated about its axis by drive means included in the apparatus, replenishing toner to the apparatus. This toner bottle has already been put on the market. The toner bottle has a mouth smaller in diameter than a body. Part of the toner bottle bulges out inward from the inner surface of a shoulder, which is formed at one end of the bottle where an opening is present, toward the edge of the opening. The bulging portion allows toner to be stably delivered from the toner bottle.

The problem with a toner bottle of the type taught in the above-mentioned document is that the drive means exerts a strong stress over the entire toner bottle when rotating the bottle. As a result, the toner leaks or flies about via the toner outlet of the mouth during operation due presumably to the stress.

SUMMARY OF THE INVENTION

It is a first object of the present invention to provide a toner bottle free from unexpected toner leakage during operation.

It is a second object of the present invention to provide a toner bottle capable of desirably delivering toner despite a stress ascribable to drive means and needing a minimum amount of material.

It is a third object of the present invention to provide a method of producing a toner bottle achieving the first and second objects.

It is a fourth object of the present invention to provide a toner bottle packed with toner and an image forming apparatus operable with the toner bottle.

A hollow, cylindrical toner bottle of the present invention discharges toner stored therein when mounted to an electrophotographic image forming apparatus in a substantially horizontal position and then rotated about its axis. The toner bottle is made up of a mouth including a toner outlet and a cylindrical wall, and a body including a circumferential wall and a bottom. The mouth is formed by injection molding. The outer circumference of the toner outlet has circularity of 0.7 mm or below.

A method of producing the above toner bottle and an image forming apparatus using the toner bottle are also disclosed.

BRIEF DESCRIPTION OF THE DRAWINGS

The above and other objects, features and advantages or the present invention will become more apparent from the following detailed description taken with the accompanying drawings in which:

FIG. 1A is a sectional side elevation showing a toner bottle embodying the present invention;

FIGS. 1B and 1C are sections each showing a specific configuration of a tubular body, which may be fitted on a mouth included in the illustrative embodiment;

FIG. 6A is a side elevation showing another specific configuration of the bulging portion;

FIG. 6B is a front view associated with FIG. 6A;

FIG. 30 is a perspective view showing a toner bottle formed with an air bent that is closed by a filter;

FIG. 31 is a vertical section showing the toner bottle of FIG. 30;

FIGS. 32 and 33 are tables each listing the results of a particular performance test.

DESCRIPTION OF THE PREFERRED EMBODIMENTS

Figure 2:
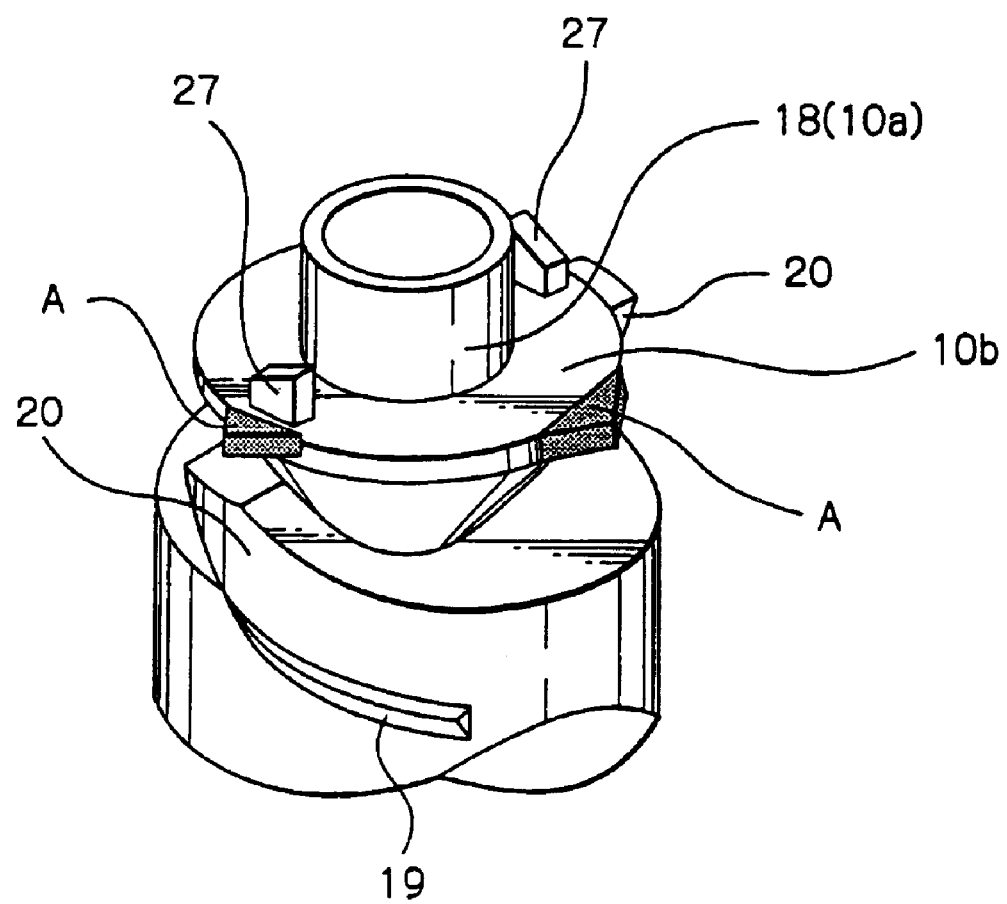
FIG. 2 is a view showing lugs formed on a circular flange included in the illustrative embodiment.

To better understand the present invention, brief reference will be made to a conventional toner bottle of the type taught in previously mentioned Laid-Open Publication No. 7-20705. As shown in FIG. 1A, the conventional toner bottle includes an elongate body 17 implemented as a bottomed, hollow cylinder. A short mouth 18 protrudes from one end of the body 17 in the axial direction of the body 17. A single spiral rib 19 protrudes radially inward from the circumferential wall of the body 17, promoting the discharge of toner stored in the body 17. The conventional toner bottle does not include a flange 10b, which will be described specifically later.

The mouth 18 has a toner outlet and a cylindrical wall. The toner bottle is laid down and then set in an electrophotographic apparatus with the end of the cylindrical wall of the mouth mating with a cylindrical engaging portion included in the apparatus. The engaging portion is generally implemented as a packing. In this position, the toner bottle is rotated about its axis in order to discharge the toner via the toner outlet. The toner is then delivered to a developing section included in the apparatus.

Usually, an elastic seal is adhered to the inner surface of the engaging portion of the apparatus in order to insure engagement close enough to prevent the toner from leaking. In practice, however, the toner often leaks via the interface between the engaging portion and the mouth due to repeated rotation of the toner bottle, contaminating not only the inside of the apparatus but also the area around the apparatus. The cause of the leak and therefore a measure against the leak has not been reported yet.

Further, in the toner bottle of the type shown in FIG. 1A, the body 5 is provided with a wall thickness greater than 1 mm for increasing mechanical strength against an intense stress ascribable to drive means, which causes the toner bottle to rotate. Such a thick wall of the body 5 needs a great amount of material and is therefore undesirable from the resource saving standpoint.

We conducted a series of researches and experiments for finding the cause of toner leakage stated above. Today, the grain size of toner is as small as 9 μm or so and is still decreasing. It was experimentally found that a small gap appeared between the cylindrical wall of the mouth being rotated and the cylindrical engaging portion of the apparatus, causing fine toner grains to leak. It was also found that the major cause of such toner leakage is the configuration of the toner outlet of the mouth. Extended researches and experiments showed that the adjustment of the accuracy of the cylindrical toner outlet was the key to the solution of the above problem.

The present invention pertains to a hollow, cylindrical toner bottle of the type being mounted to an electrophotographic image forming apparatus in a substantially horizontal position and configured to discharge toner stored therein when rotated about its axis. In accordance with the present invention, the toner bottle has a body and a mouth made up of a hollow cylindrical wall and a toner outlet. The body is made up of a circumferential wall and a bottom. The mouth is formed by injection molding. The toner outlet of the mouth has circularity of 0.7 mm or less. The toner bottle with this configuration was found to be far more desirable than the conventional toner bottle as to toner leakage. The circularity should more preferably be 0.4 mm or less, as determined by experiments. The term "circularity" refers to a value produced by measuring the maximum and minimum outside diameters of the toner outlet and then subtracting the latter from the former.

The crux or the present invention is that the toner outlet has circularity of 0.7 mm or less, as stated above. Therefore, a tubular member that forms a toner outlet with such a degree of circularity may even be produced by injection molding beforehand and then fitted on the mouth, as will be described hereinafter. FIGS. 1B and 1C each show a particular configuration of the tubular body. As shown, tubular bodies 18-2 and IR-3 each are fitted on a portion 18-1 contiguous with the body of the toner bottle, forming the mouth. The tubular bodies 18-2 and 18-3 have end portions a1—a1 and b1–b2, respectively, each having circularity of 0.7 mm or less. In this case, the portion 18-1 contiguous with the body does not have to be formed by injection molding or provided with circularity of 0.7 mm or less.

Injection molding allows the circularity of the mouth to be easily adjusted and causes resin to form a minimum of burr around the toner outlet. Usually, the gate of a mold for introducing molten resin leaves its mark on a molding produced by injection molding.

In accordance with the present invention, the toner bottle may additionally include a flat flange surrounding the cylindrical wall of the mouth and substantially perpendicular to the axis of the cylindrical wall. Some different functions may be assigned to the flange. The flange may be circular or polygonal, as desired. The flange may be used to position the toner bottle relative to an electrophotographic image forming apparatus when the former is mounted to the latter. More specifically, the flange has a circumferential edge serving the same function when circular or has corners serving the same function when polygonal. Further, when the flange is polygonal, the vertexes of the polygon must lie substantially on the same circle; the polygon should preferably be a regular polygon.

Referring again to FIG. 1, a toner bottle embodying the present invention will be described. As shown, the toner bottle includes the previously mentioned circular flange 10b surrounding the cylindrical wall of the mouth 18. Generally, among toner bottles, some are exclusively applicable to particular types of image forming apparatuses while some are applicable to image forming apparatuses in general. Some image forming apparatuses therefore lack a structure for positioning the toner bottle with the flange 10b. In this sense, the toner bottle with the flange 10b is applicable even to an image forming apparatus locking the above structure only if the toner outlet satisfies the previously stated condition as to circularity. To exhibit the positioning function, the flange 10b should preferably have a diameter matching with the diameter of the body 17.

The toner bottle of the type disclosed in Laid-Open Publication No. 7-20705 and put on the market includes a bulging portion, which will be described later, bulging inward from the circumferential wall of the body. Three or more lugs protrude around the bulging portion and constitute a positioning portion for positioning the toner bottle relative to an electrophotographic image forming apparatus. The toner bottle of the present invention may also include such a positioning portion.

In accordance with the present invention, the axis of the positioning portion mentioned above and the axis of the circular toner outlet have as small "coaxiality" as possible for obviating toner leakage. The term "coaxiality" refers to a deviation (mm) between the axis of the positioning portion and that of the toner outlet, as will be described more specifically later. The coaxiality should preferably be about 1.0 mm or less, more preferably about 0.7 mm or less. Such coaxiality is particularly effective when the positioning portion may be implemented by the flange 10b close to the toner outlet.

The conventional toner bottle with the bulging portion has coaxiality as great as about 1.2 mm. The flange 10b constitutes a particularly effective positioning portion when provided with a polygonal shape.

FIG. 2 shows a specific circular configuration of the flange 10b. As shown, three lugs A (only two are visible) extend radially outward from the flange 10b. The lugs A allow the toner bottle to be easily set in an image forming apparatus. For accurate positioning, the lugs A should preferably be positioned on the same circle. More than three lugs are difficult to form on the conventional type of toner bottle because the toner bottle lacks in molding accuracy.

Figure 3:
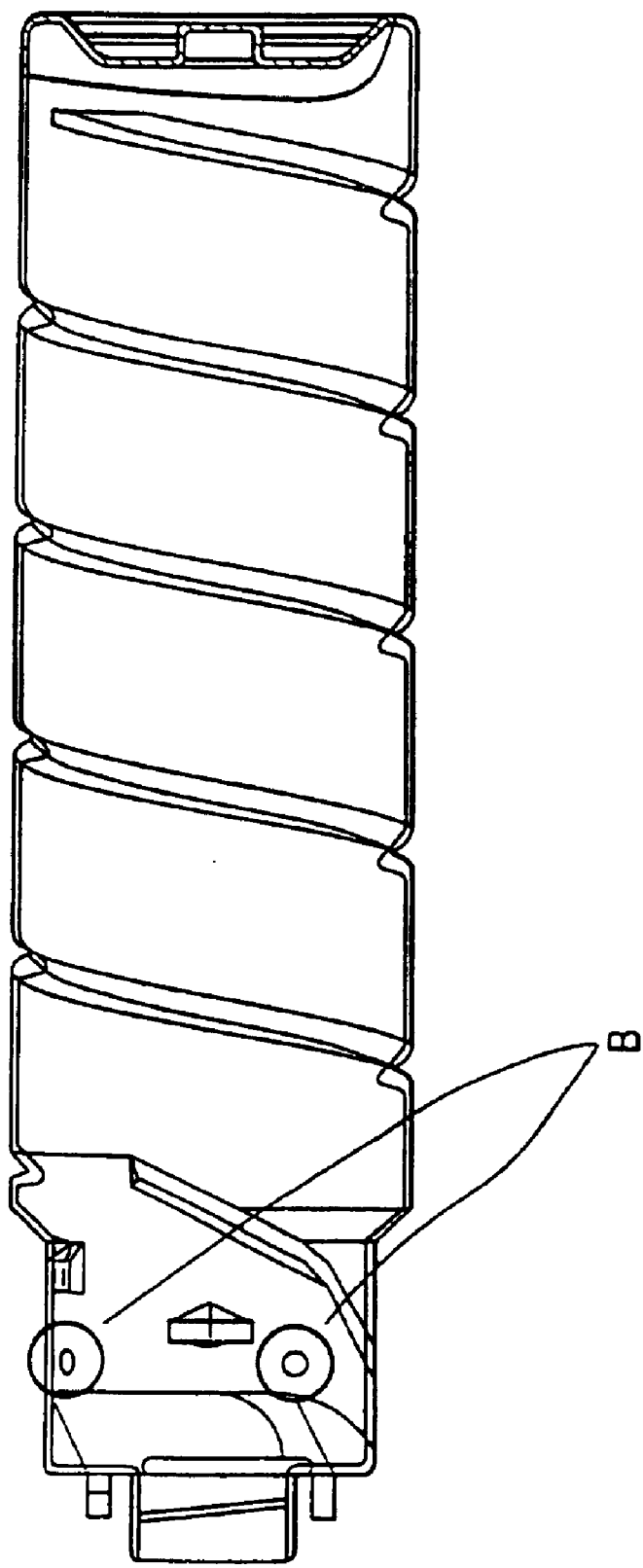
FIG. 3 is a side elevation showing a conventional toner bottle including positioning lugs.

FIG. 3 shows a conventional toner bottle formed with positioning lugs B. As shown, the positioning lugs B are not positioned on a mouth, but positioned on part of the body adjoining the mouth.

The flange 10b may be formed with, e.g., ribs or lugs for imparting rotation to the toner bottle. Further, the flange 10b may be painted in a particular color indicative of the kind of the toner stored in the toner bottle. The flange 10b may be molded integrally with the cylindrical wall of the mouth or may be produced beforehand and then fitted on the cylindrical wall, as desired.

We achieved the second object stated earlier also, as will be described hereinafter. In accordance with the present invention, the circumferential wall of the toner bottle is as thin as 1 mm or less and therefore needs a minimum amount of material. Further, part of the circumferential wall is reinforced so as to withstand a stress continuously applied from the drive means to the toner bottle during operation. The toner bottle can therefore maintain its toner feeding function and does not break not only during operation but also before and after use. The function required of the toner bottle is achievable even when the above wall thickness is about 0.2 mm to 0.5 mm. Experiments showed that the toner bottle of the present invention halved the amount of material required, compared to the conventional toner bottle.

The toner bottle with such a thin wall saves the material and allows a person to see its content through the wall by eye. In addition, the toner bottle can be crushed when emptied. In fact, when the empty toner bottle formed of PET (polyethylene terephthalate) or PP (polypropylene) was compressed by hand in the radial direction, it was crushed in the radial direction.

A toner bottle embodying the present invention will be described hereinafter. Because the illustrative embodiment is identical with the configuration taught by Laid-Open Publication No. 7-20705 as to basic structure, it will be described with reference again be made to FIG. 1A. As shown, the toner bottle, generally 13, includes the elongate body 17 implemented as a bottomed hollow cylinder. The short mouth 19 protrudes from one end of the body 17 in the axial direction of the body 17.

The dimensions of the portions constituting the toner bottle are dependent on the desired size of the toner bottle. In the illustrative embodiment, the toner outlet of the mouth has the maximum outside diameter of about 40 mm. The cylindrical wall of the mouth is 2.5 mm to 2.5 mm thick and 15 mm to 35 mm long. The body 17 is 200 mm to 500 mm long and has an outside diameter of 50 mm to 100 mm. The cylindrical wall mates with the engaging portion of an image forming apparatus over a length of 5 mm or so although it is also dependent on the overall configuration of the toner bottle.

The flange 10b provided on the mouth has a diameter of about 30 mm or above and a thickness of 1 mm to 3 mm. The flange 10b should preferably be positioned at a distance of 10 mm to 30 mm from the toner outlet. The diameter of the flange 10b should preferably be matched to the outside diameter of the body 17 in order to facilitate positioning. Further, the diameter of the flange 10b should preferably be greater than the diameter of the toner outlet by 3 mm or more from the positioning and production standpoint.

In the toner bottle of the present invention, the mouth and body may be molded integrally with each other or may alternatively be separated from each other at a position that does not disturb the function of the toner bottle. The mouth and body produced separately from each other will be connected together by a tape, screw-thread or similar means. This separable structure allows the mouth and tube to be separated and then washed for reuse. For example, the mouth and body may be respectively formed by injection molding and another method and dealt with as separate parts. Particularly, the mouth and body should preferably be molded integrally with each other, but separable at the boundary between the mouth and the body. This not only reduced the number of parts and therefore production cost, but also enhances the function of the toner bottle.

Figure 4:
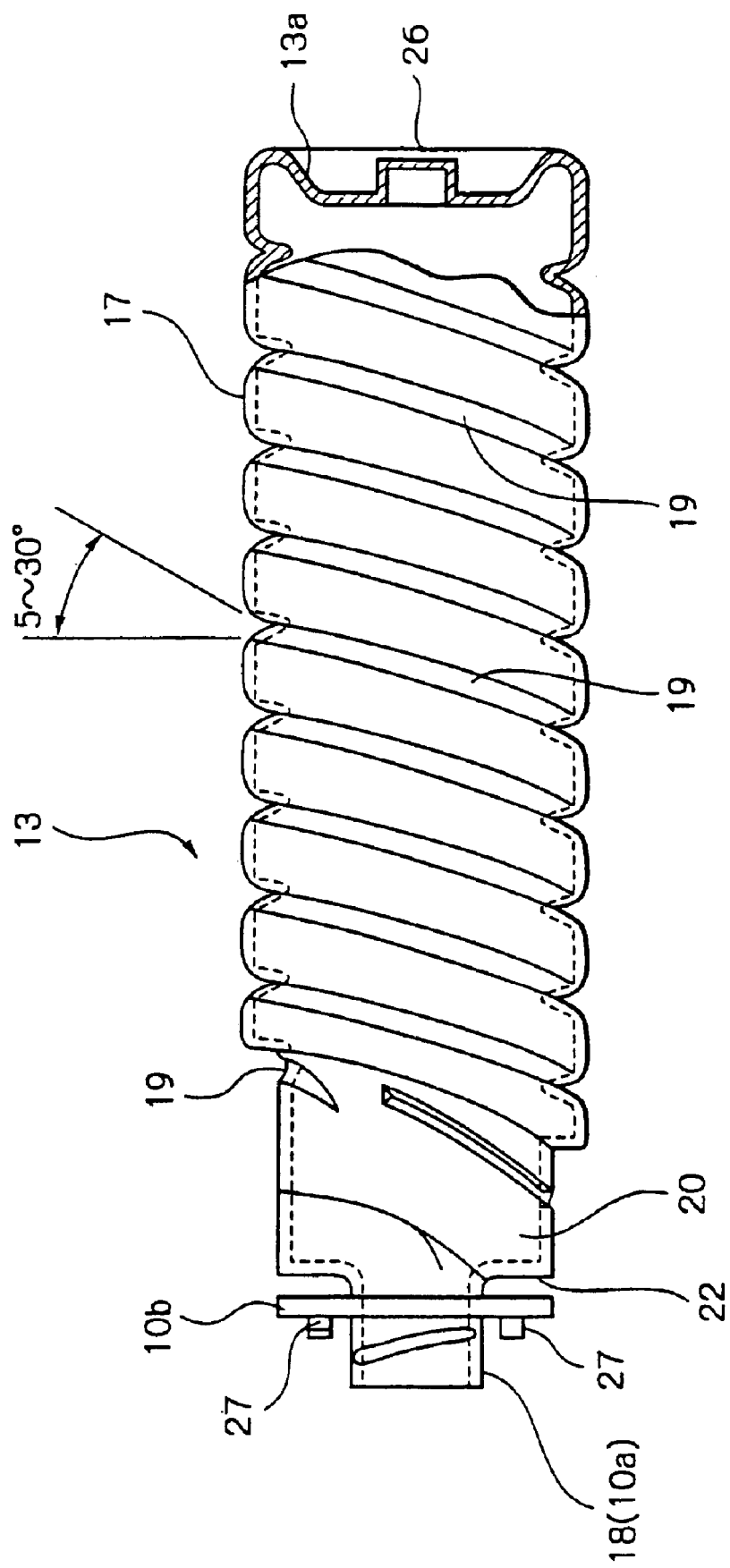
FIG. 4 is a side elevation showing a specific reinforcing structure included in the illustrative embodiment.
Figure 5B:
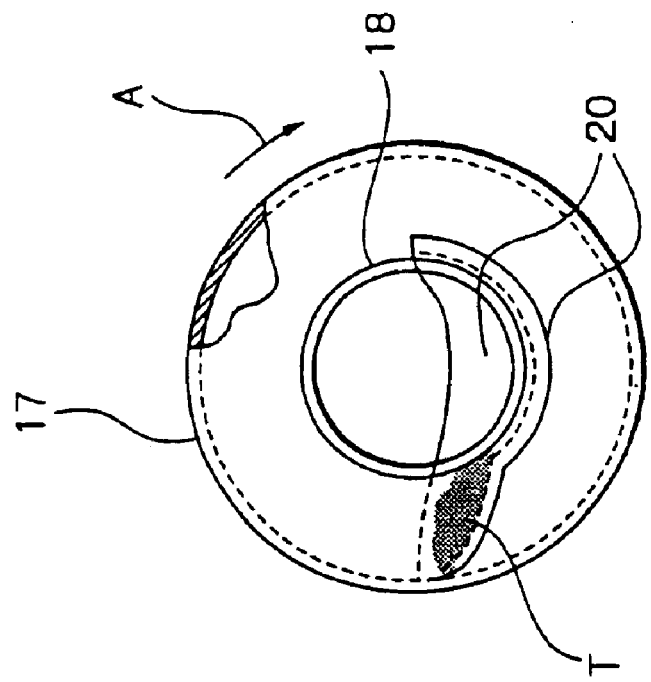
FIG. 5B is a front view of the bulging portion.
Figure 5A:
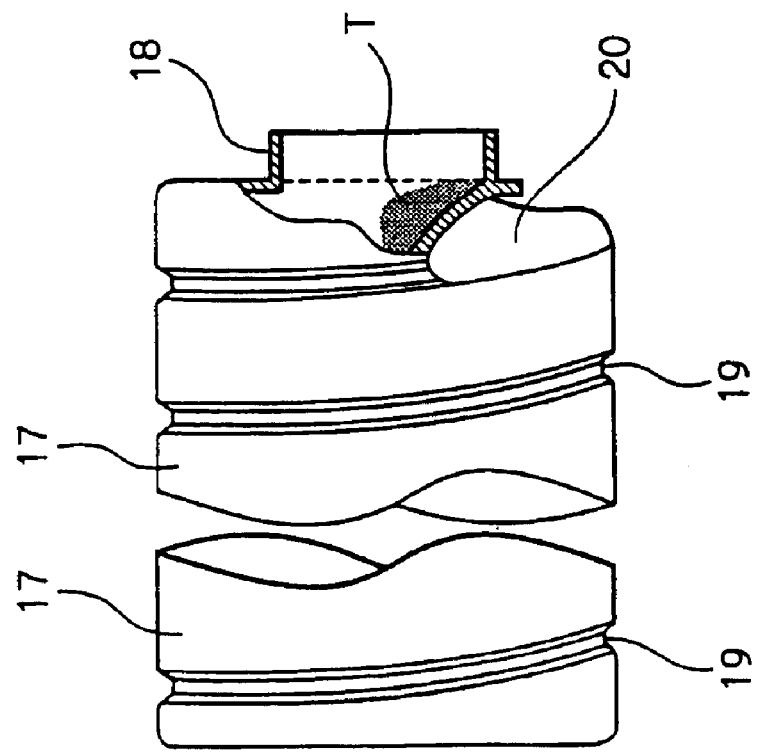
FIG. 5A is a side elevation showing a bulging portion included in the illustrative embodiment.

Various additional conditions for improving performance required of the toner bottle will be described hereinafter. The toner bottle of the illustrative embodiment may also be formed with a single spiral rib 19, as shown in FIG. 1A. The rib 19 allows the toner to be discharged from the toner bottle along the rib 19A despite that the toner bottle is laid down in an electrophotographic image forming apparatus. The toner bottle may be formed with two or more ribs for increasing mechanical strength, if desired. FIG. 4 shows a specific configuration in which the toner bottle is formed with two spiral ribs 19 identical in pitch with each other. The angle between each rib 19 and the axis of the toner bottle should preferably be 5° and 30°.

As also shown in FIG. 4, part of the circumferential wall of the body 17 adjoining the mouth 18 sequentially bulges toward the axis of the toner bottle 13 over approximately one half of the circumference. The bulging portion, labeled 20, is contiguous with the spiral ribs 19 and protrudes toward the axis of the toner bottle 13 over the inside diameter of the mouth 18. With this configuration, the bulging portion 20 contributes to the stable delivery or the toner from the toner bottle 13.

More specifically, after the toner bottle 13 has been set in the apparatus in a substantially horizontal position, it is caused to rotate about its axis. As a result, the ribs 19 drive the toner inside the toner bottle 13 toward the mouth 18. The bulging portion 20 adjoining the mouth 18 moves the toner toward the axis or center of the toner bottle 13. Finally, the toner accumulated on the bulging portion 20 slides down to the toner outlet of the mouth 18. FIGS. 5A, 5B, 6A and 6B demonstrate such a function of the bulging portion 20. In these figures, arrow A is indicative of the direction of rotation of the toner bottle 13 while the mouth 18 illustrated in a simplified form.

Figure 7:
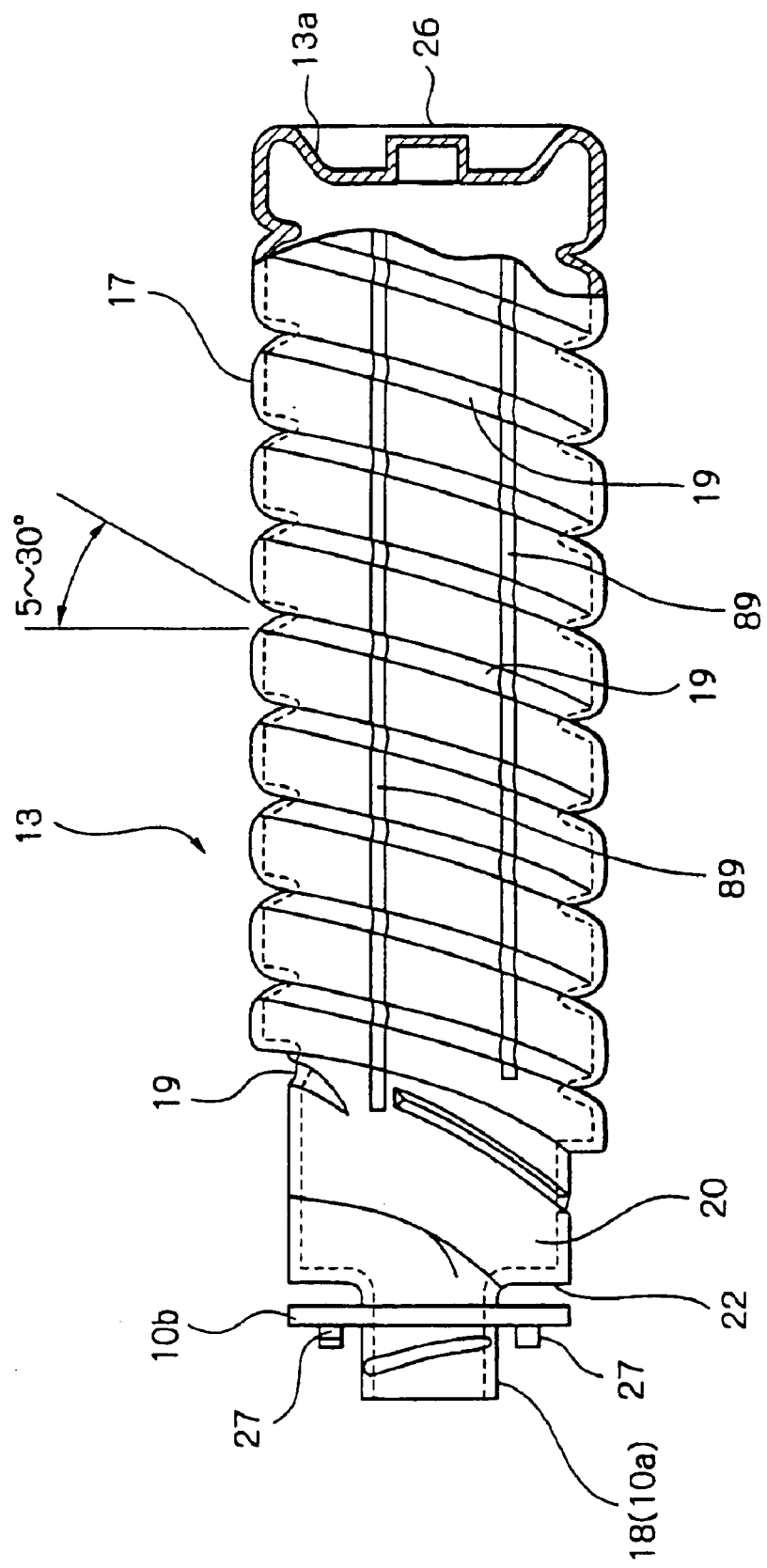
FIG. 7 is a sectional side elevation showing essential part of an alternative embodiment of the present invention.

FIG. 7 shows another specific configuration of the toner bottle 13. As shown, one or more straight ribs 89 protrude from the inner surface of the body 17 toward the axis of the bottle 13. The straight ribs 99 extend in the axial direction of the toner bottle 13 across the two spiral ribs 19. The straight ribs 89 further increase the mechanical strength of the toner bottle 13. This is a specific form of the reinforcing structure unique to the illustrative embodiment.

Figure 8:
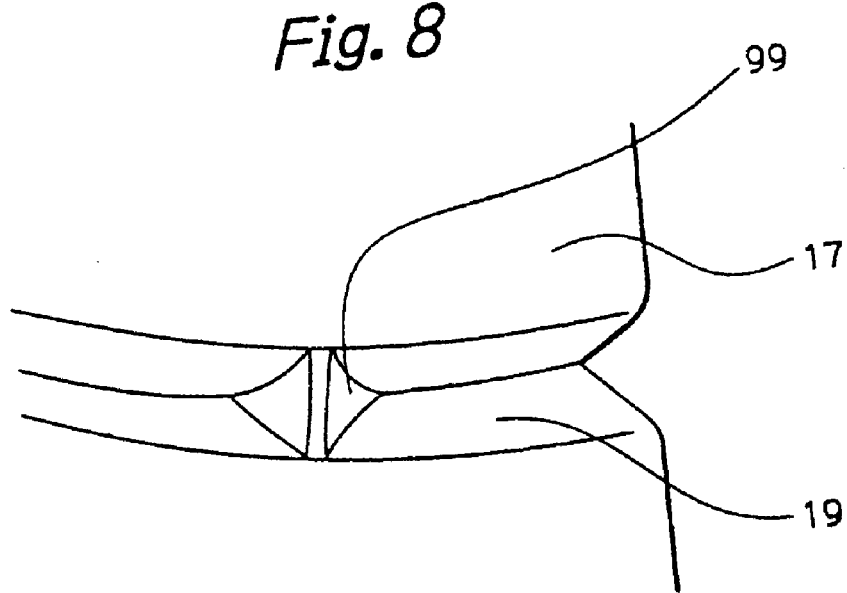
FIG. 8 is a view showing an axial recess formed in a spiral rib.

FIG. 8 shows still another specific configuration of the toner bottle 13. As shown, a plurality of ribs 99 protrude from the bottom of a recess, which is formed on the outer surface of the body 17 and reciprocal to the rib 19. The ribs 99 provide the toner bottle 13 with additional mechanical strength. This is another specific form of the reinforcing structure unique to the illustrative embodiment.

To increase the mechanical strength of the toner bottle 13, the circumferential wall of the body 17 itself may be made white or whitish (clouding hereinafter), as will be described specifically later. Clouding not only increases the strength of the clouded portion, but also stabilizes dimensions. This is presumably because the material constituting the wall itself becomes semicrystalline. Presumably, the tone varies from whitish to white in accordance with the degree of semicrystallization.

Figure 9:
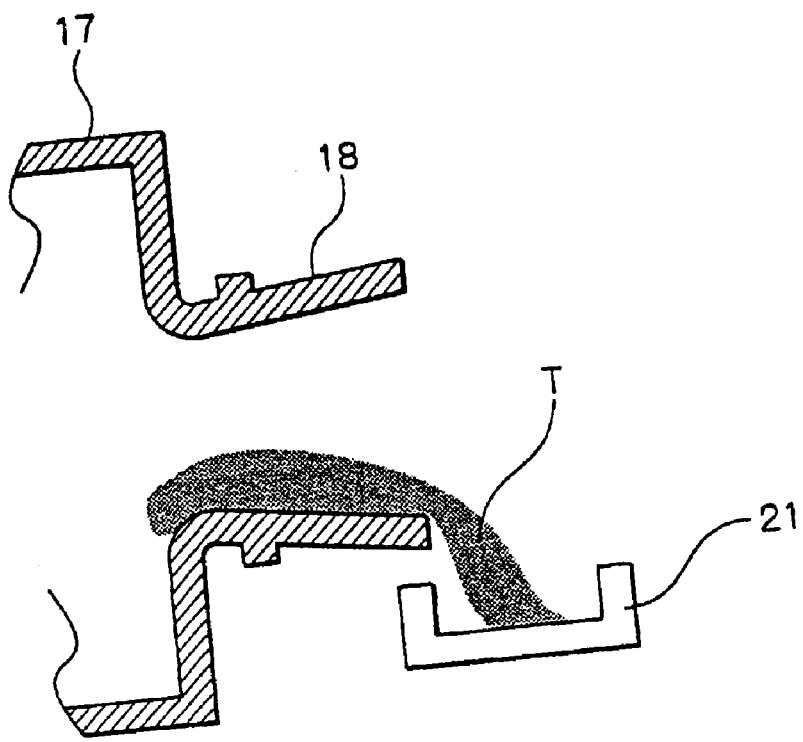
FIG. 9 is a fragmentary section of a modification of a mouth included in the embodiment of FIG. 7.

FIG. 9 shows a modification of the toner bottle 13. As shown, the mouth 18 is flared outward to smoothly guide toner T from the mouth 18 toward a toner inlet 21 included in the image forming apparatus. Of course, only the inside diameter of the mouth 18 may be sequentially increased toward the outside of the toner bottle 13.

Resins applicable to the toner bottle 13 of the present invention will be described hereinafter. While any suitable resin is applicable to the toner bottle 13, use is made of, e.g., PET, PE (polyethylene), PP or polystyrene. Among them, PET is particularly useful when it comes to the toner bottle of the present invention needing accurate molding. The resin should preferably have mold shrinkage of about 4/1000 to 6/1000 from the molding accuracy standpoint. The mold shrinkage refers to a ratio of the size of a molding to that of a mold. Further, the toner bottle may be formed of a mixture of the above resins or a copolymer containing them.

The toner is apt to electrostatically adhere to the inner periphery of the toner bottle 13 during operation. In light of this, an anti-static agent may be added to the material of the toner bottle 13. This successfully reduces the amount of toner to remain in the toner bottle 13 when the bottle 13 is emptied. This is also true when a mixture, which will be described later, is used for the toner bottle 13.

Assume that the toner bottle 13 is formed of a mixture of PET and another substance, e.g., PE. Then, PE should advantageously be added to PET by 2 wt % to 10 wt %. The PET and PE mixture provides the entire toner bottle 13 with whitish, glossy tone. This not only protects the toner from deterioration by intercepting extraneous light, but also provides the toner bottle 13 with attractive appearance.

The mixture of PET and another resin is introduced in an injection molding machine in order to produce a preform. In this case, the resin other than PET may be pelletized beforehand and then mixed with PET. Although the pelletized resin renders the toner bottle 13 slightly opaque, opaqueness desirably protects the toner stored in the toner bottle 13 from deterioration.

For the toner bottle 13, use may be made of resin reclaimed from used products collected on the market or wastes available from a factory. However, resin reclaimed from various kinds of, e.g., PET bottles is irregular in characteristic and unstable from the molding standpoint. It is therefore desirable to mix virgin resin of the same kind as reclaimed resin with the reclaimed resin. The mixture ratio of virgin resin to reclaimed resin is dependent on the application and the condition and duration of storage of the reclaimed resin.

Reclaimed resin or a mixture of reclaimed resin and virgin resin of the same kind is applicable to a preform that is used for biaxial, stretch blow molding, which will be described later specifically. However, a reclaimed material usually contains resins with low stretchability and is apt to lower metal transferability, making it difficult to produce a toner bottle having a sophisticated configuration. In light of this, an adequate amount of plasticizer that enhances stretchability may advantageously be added to the reclaimed material before the reclaimed material is introduced into an injection molding machine. A phthalic plasticizer is desirable among others.

Further, a mixture of reclaimed PET and resin other than PET, e.g., olefin resin is another material applicable to the toner bottle of the present invention. This mixture renders the toner bottle opaque and protects the toner stored in the bottle from deterioration ascribable to extraneous light.

When use is made of a mixture or a reclaimed material and virgin resin different in kind from the reclaimed material, it is preferable to add a plasticizer to the virgin resin and pelletize the resulting mixture beforehand. This facilitates the mixing of the reclaimed material and virgin resin.

Figure 10:
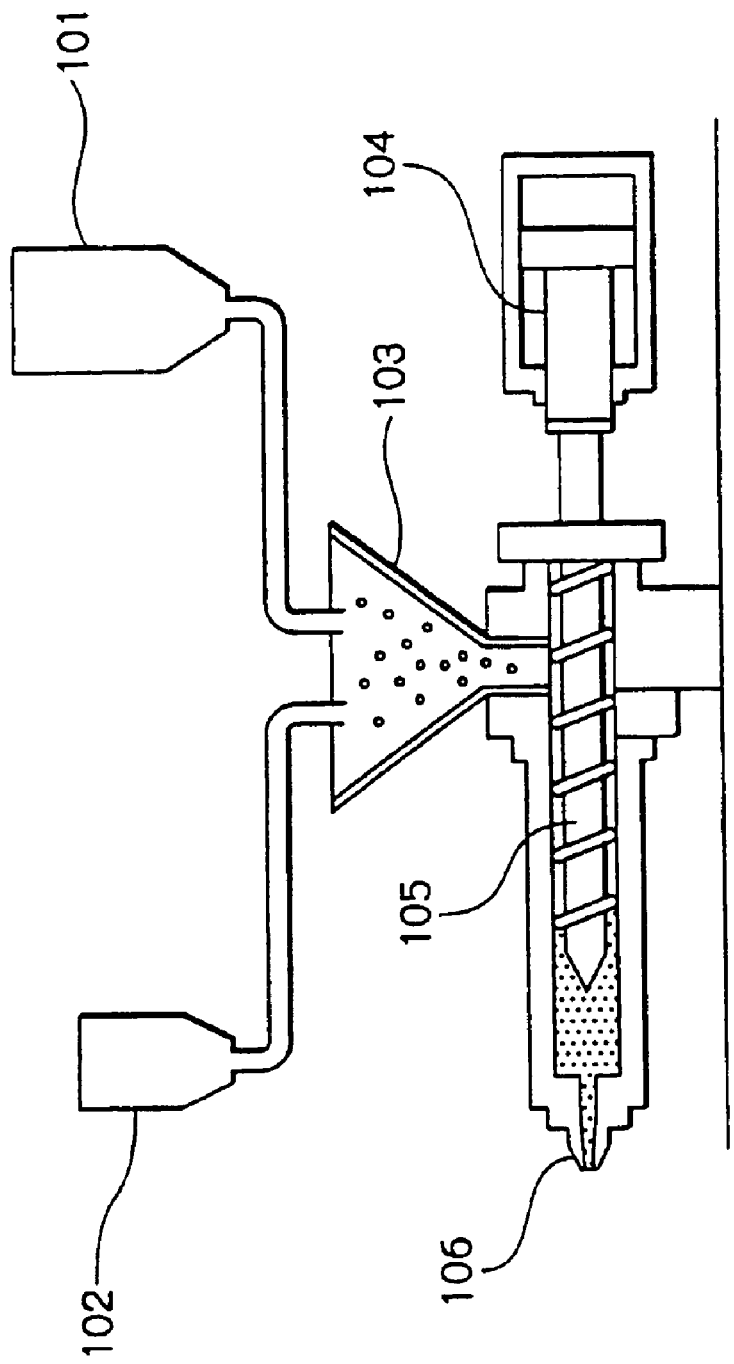
FIG. 10 is a view showing a specific configuration of an injection molding machine.

FIG. 10 shows a specific system for mixing PET and resin other than PET. As shown, the system includes a hopper dryer assigned to PET, a hopper dryer 102 assigned to a reclaimed material or resin other than PET with or without a plasticizer, a hopper 103, a cylinder 104, a screw 105, and a nozzle 106. The screw 105 in rotation pulverizes and mixes the materials collected in the hopper 103 from the hopper dryers 101 and 102. At the same time, the materials being pulverized are caused to melt by heat. The resulting molten mixture is extruded via the nozzle 106 toward an injection molding stage not shown.

Figure 11:
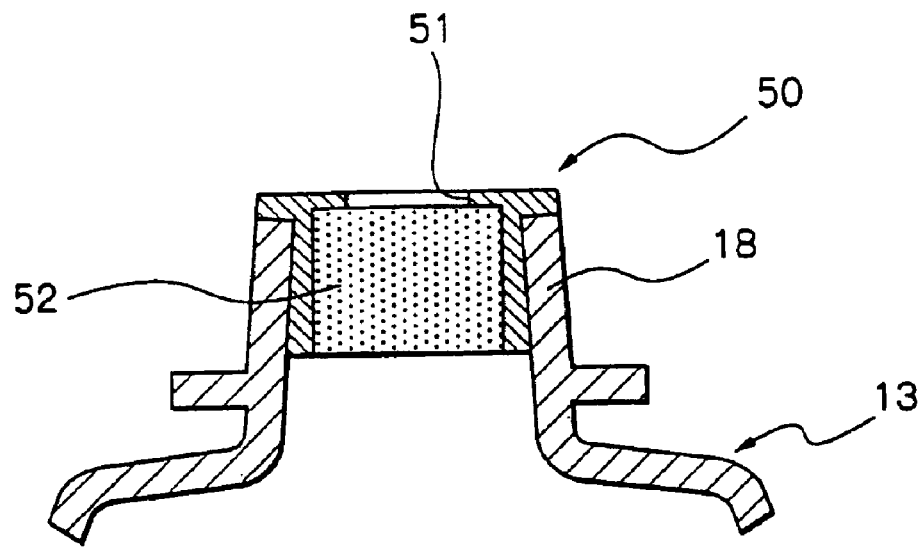
FIG. 11 is a fragmentary section showing a cap fitted in the mouth.

Specific configurations of a cap that stops the mouth 18 of the toner bottle 13 will be described hereinafter. FIG. 11 shows a cap 50 formed with an air vent 51. A piece of open-cell sponge 52 is fitted in the cap 50 to play the role of a filter. The open-cell sponge 52 allows air to pass therethrough, but intercepts the toner packed in the toner bottle 13. When the toner bottle 13 is crushed after running out of the toner, the air vent 51 and sponge 52 prevent the toner left in the bottle 13 from being blown out.

Figure 12:
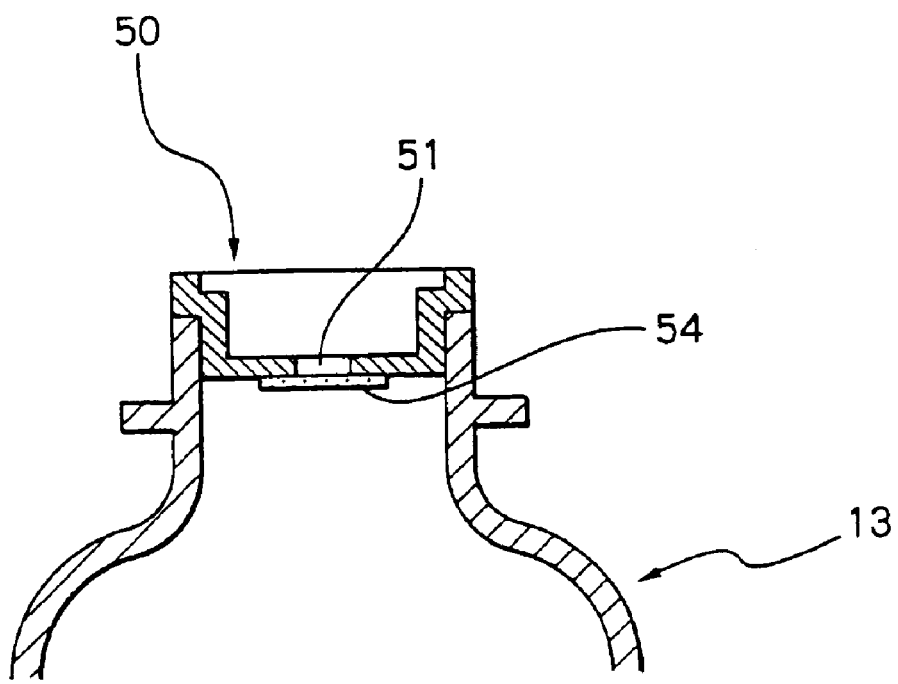
FIG. 12 is a view showing another specific configuration of the cap provided with a seal formed of unwoven cloth.

FIG. 12 shows another specific configuration of the cap 50. As shown, the cap 50 is formed with a recess facing outward. A seal 54 implemented by unwoven cloth is adhered to the cap 50 in such a manner as to close the air vent 51.

Figure 13:
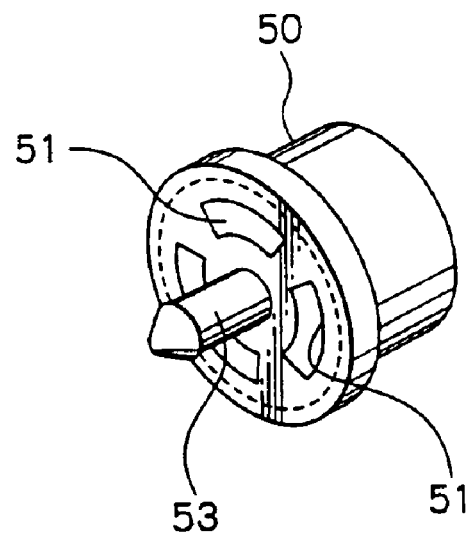
FIG. 13 is a perspective view showing a modification of the cap.

Laid-Open Publication No. 7-20705 mentioned earlier teaches a system for automatically removing a cap from a new toner bottle and again fitting the former on the latter. Specifically, a collet chuck built in an image forming apparatus removes a cap from a toner bottle newly set in the apparatus. When the toner bottle is emptied, the collet chuck again pushes the cap into the toner bottle. FIG. 13 shows a modification of the cap 50 configured in consideration of the above system. As shown, the cap 50 includes a lug 53 to be chucked by the collet chuck.

Hereinafter will be described a method of producing the toner bottle of the present invention. The toner bottle of the present invention consists of the mouth and body that are molded integrally with each other or separable from each other, as stated earlier. The crux is that at least the mouth portion be produced by injection molding. To make the mouth and body separable, there are produced only the mouth or the mouth and suitable part of the body by injection molding and the entire or the rest of the body.

Further, a tubular body whose circularity is 0.7 mm or less may be produced by injection molding beforehand and then fitted on the mouth, as described previously. In this case, at least the tubular body should be formed by injection molding.

The method to be described assumes the toner bottle having the mouth and body molded integrally with each other and including the circular flange and biaxial, stretch blow molding by way of example. While biaxial, stretch blow molding is feasible for the toner bottle of the present invention needing molding accuracy, it may, of course, be replaced with any other suitable molding method.

Biaxial, stretch blow molding consists of a preform molding step and a stretch, blow molding step. The preform molding step molds a preform of resin by injection molding. The stretch, blow molding step softens the preform (parison) removed from a mold by heat and then subjects it to blow molding and stretching. The mouth portion of the preform directly turns out the mouth of the toner bottle. Therefore, the mouth portion of the preform should preferably be molded by injection such that it satisfies the condition required of the mouth.

Figure 14:
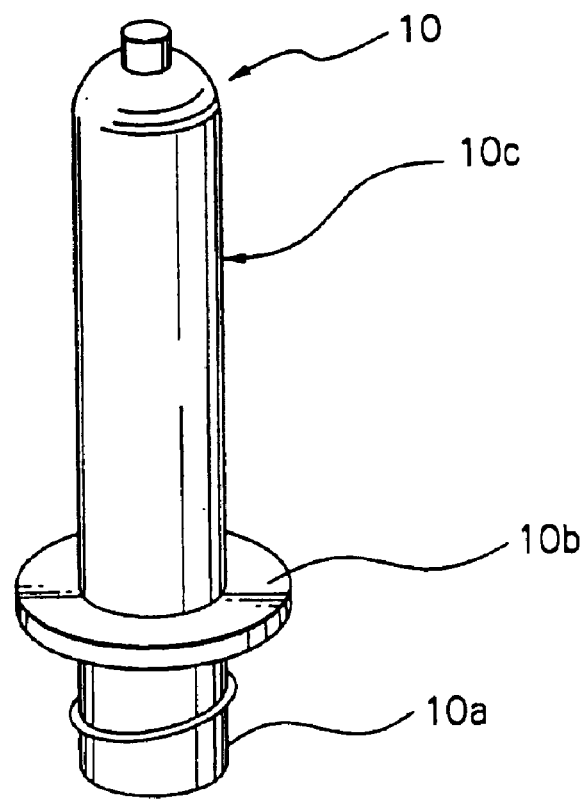
FIG. 14 is a view showing the basic configuration of a preform.

FIG. 14 shows the basic configuration of a preform 10. As shown, the preform 10 is made up of a mouth portion 10*a*, a support ring portion 10*b*, and a stretch blow portion 10*c*. The mouth portion 10*a* and support ring portion 10*b* essentially constitute the mouth and flange of the toner bottle of the present invention, respectively. It follows that circularity and coaxiality stated earlier are substantially determined by the molding accuracy of the preform 10. In this sense, a mold for injection molding is the point, i.e., it is necessary to adjust a mold in such a manner as to form a mouth having the desired circularity. This is also true with coaxiality. To protect the mouth portion and support ring portion of the preform 10 from deformation, it is necessary to soften the preform 10 by heat before it is fully cooled off.

To soften the preform 10 by heat, a plurality of portions of the preform 10 are heated at different temperatures matching with the configuration of the toner bottle with the preform 10 being rotated about its axis. After the above portions have been softened to different degrees, the preform 10 is subjected to stretch blow molding.

Figure 15A:
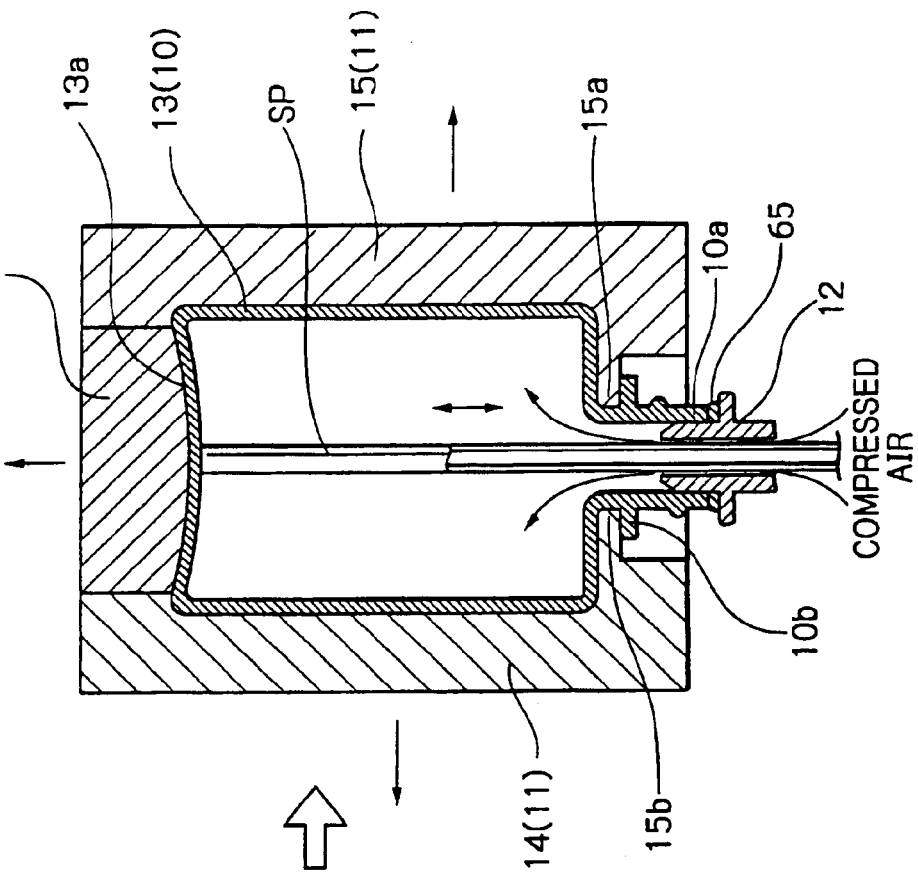
FIGS. 15A and 15B are views demonstrating a sequence of steps for forming a toner bottle in accordance with the present invention.

More specifically, as shown in FIG. 15A, the stretch blow portion 10*c* of the preform 10 is heated at positions No. 1 through No. 6 at different temperatures. The prerequisite with the present invention is that the temperature of the preform 10 just after heating be higher than the glass transition point of resin. The preform 10 should preferably be cooled little by little after heating and then subjected to stretch blow molding before it is fully cooled off.

PET, for example, has a glass transition point of about 76° C., so that the preform 10 is heated at a temperature higher than 76° C. When the preform 10 is heated at a temperature lying in the range of from 85° C. to 100° C., it easily stretches in the axial direction (lengthwise) and implements a thin wall. On the other hand, when the preform 10 is heated at a temperature between 105° C. and 115° C., it is clouded and stretches little in the axial direction while easily stretching in the circumferential direction, implementing a thick wall. More specifically, even when the surface temperature of the preform 10 is high after natural cooling, the preform 10 stretches little in the axial direction if crystallized and consequently stretches in the horizontal direction. The heating temperature should therefore be selected in accordance with the configuration of the toner bottle. The trunk portion, for example, is heated at 85° C. to 100° C. while the bulging portion is heated at 105° C. to 115° C. The clouded portion has high mechanical strength and is particularly desirable for the portion of the toner bottle that needs high dimensional stability and high mechanical strength.

In the biaxial, stretch blow molding step to follow, the preform 10 is introduced into a mold and coupled over a carrier pin. Compressed air is blown into the preform 10 in order to strongly stretch the preform 10 except for the root portion in the circumferential direction. At the same time, a stretch pin presses the preform 10 toward the bottom in the axial direction. As a result, a stretched portion sequentially extends from the mouth portion of the toner bottle toward the bottom of the same like an elongate balloon while a non-stretched portion adjoining the bottom sequentially decreases. Finally, the preform 10 is stretched up to the bottom, forming the toner bottle having the target configuration.

The flange should preferably have an outside diameter of about 30 mm or above and a thickness of 1 mm to 3 mm, as stated earlier. The support ring portion 10*b* is mechanically fixed in place within the mold so as not to be blown off by compressed air. At this instant, the mechanical restraint and the thickness or the outside diameter of the support ring portion 10*b* should preferably be adjusted in such a manner as to prevent the portion 10*b* from being deformed or inclined. Further an R- or a C-surface should advantageously be formed between the cylindrical wall of the mouth portion and the support ring portion 10*b* for freeing the portion 10*b* from deformation or inclination.

Figure 15B:
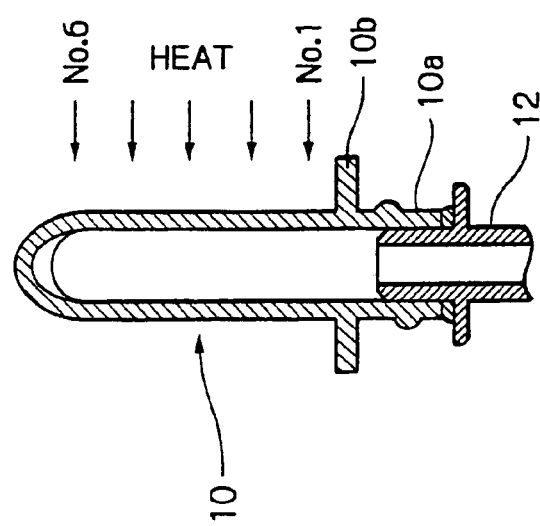

Biaxial, stretch blow molding will be described more specifically with reference to FIG. 15B. As shown, the preform 10 is set on a carrier pin 12 and heated by a heater. Subsequently, the preform 10 is introduced into a mold 11, i.e., a cavity between a pair of side halves 14 and 15. After the side halves 14 and 15 have been closed, a stretch pin SP is inserted into the preform 10 via the mouth portion. In this condition, compressed air is sent into the preform 10 via a blow pin 12 while the stretch pin SP is caused to stretch the bottom of the preform 10. At this instant, the stretch pin SP is moved back and forth along the axis of the preform 10, thereby stretching the preform 10.

Subsequently, the side halves 14 and 15 are opened while a bottom mold is moved away from the bottom 13a of the toner bottle 13 in order to produce the bottle 13. During the sequence of steps, the temperature and position of the heater, the pressure of compressed air and the timing of movement of the stretch pin SP may be suitably controlled in order to set up optimum conditions.

The side halves 14 and 15 respectively include relatively thick projections 15a and 15b adjoining the support ring portion 10b of the preform 10. The projections 15a and 15b form the base portion 18a of the toner bottle 13 and a shoulder 22 contiguous with the base portion 18a, as shown in FIG. 1A.

Figure 16:
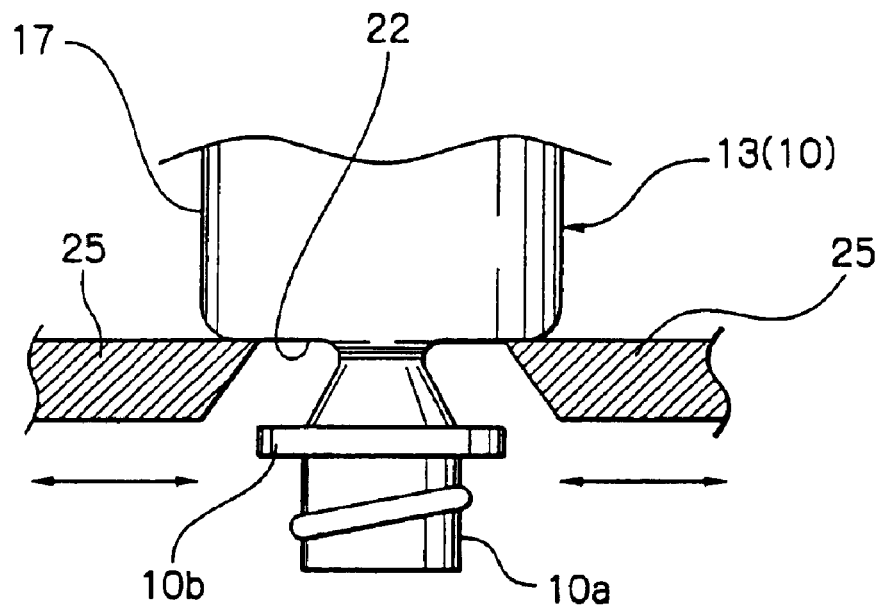
FIG. 16 is a view showing a slider for forming the bulged portion of the present invention.
Figure 17:
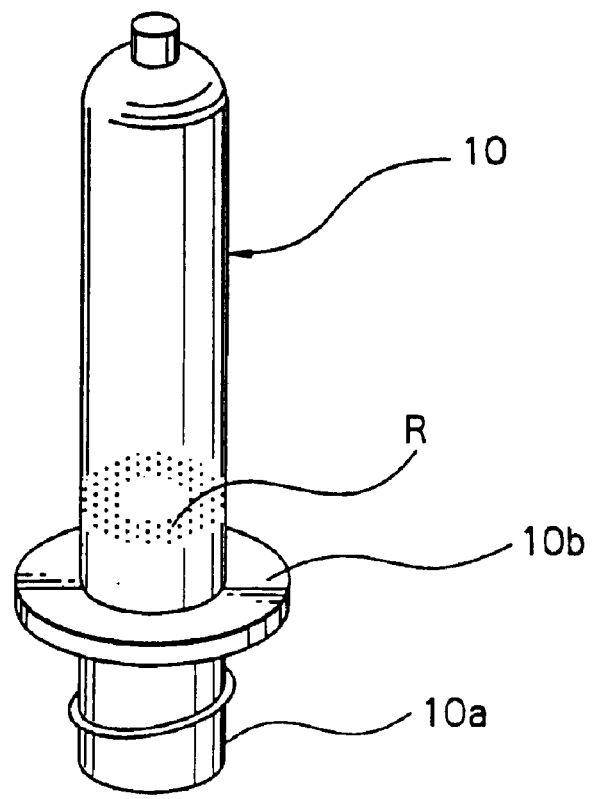
FIG. 17 is a perspective view of a preform for forming a toner bottle in accordance with the present invention.

FIG. 16 shows a slider 25 that may be used to form the bulging portion 20 of the toner bottle 13 by biaxial, stretch blow molding. As shown, the slider 25 is extendable from the mold surface of the side half 14 or 15, as indicated by a double-headed arrow. The slider 25 should preferably be moved at a timing that does not disturb the final configuration of the body 17 of the toner bottle 13 in consideration of the stretching conditions. To drive the slider 25, use may be made of a servo motor by way of example.

As for the bulging portion 20 and shoulder 22 with a sophisticated configuration, the portion of the preform 10 to contact the mold surface of the mold 11, e.g., the surface portion R of the preform 10 shown in FIG. 7 should preferably be roughened. The roughened surface successfully reduces the substantial contact area between the preform 10 and the mold 11 for thereby insuring smooth stretching of the preform 10. In addition, the roughened surface reflects heat and thereby effectively raises temperature. This reduces the amount of heat necessary for stretching the preform 10.

Specifically, the preform 10 may be subjected to blasting before biaxial stretch in order to form the roughened surface R. Alternatively, the preform 10 may be formed with the roughened surface R by abrasive cloth or abrasive paper. Further, part of the mold corresponding to the surface R may be textured.

When biaxial, stretch blowing is used to form the toner bottle 13, gas present between the preform 10 or the toner bottle 13 and the mold 11 is usually discharged via a gas vent. As a result, a bump is formed on the outer periphery of the toner bottle 13.

Figure 19:
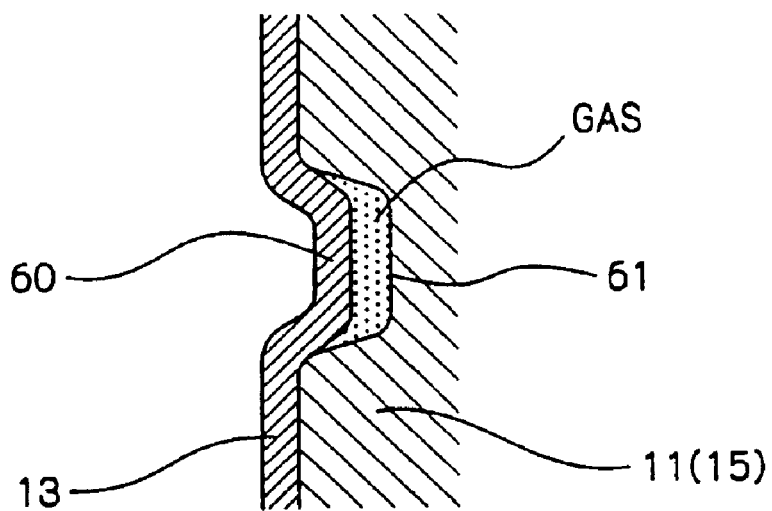
FIG. 19 is a view for describing a problem arising when the toner bottle of FIG. 18 including a projection is formed.

As shown in FIG. 10, assume that a projection 60 is to be formed on part of the toner bottle 13 for an ornamentation or a function purpose. Then, it is difficult to maintain the molding accuracy of the projection 60. More specifically, as shown in FIG. 19, gas stays in a recess 61 formed in the mold 11 for forming the projection 60, preventing the toner bottle 13 from being sufficiently stretched into the recess 61. This lowers the molding accuracy of the projection 60.

Figure 18:
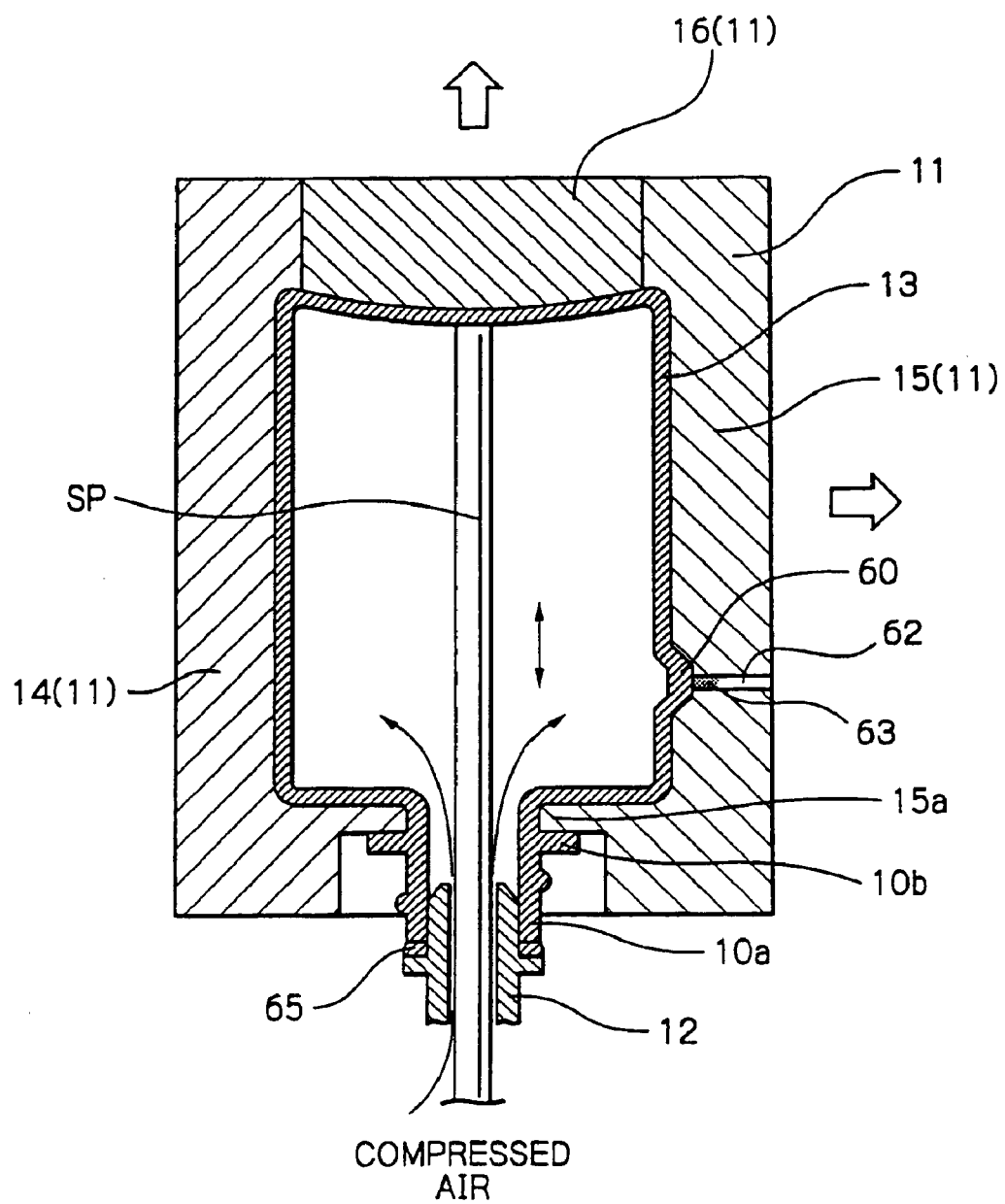
FIG. 18 is a view showing a mold for biaxial blow molding, which is used to produce a toner bottle of the present invention; and demonstrating a molding method using the mold.
Figure 20:
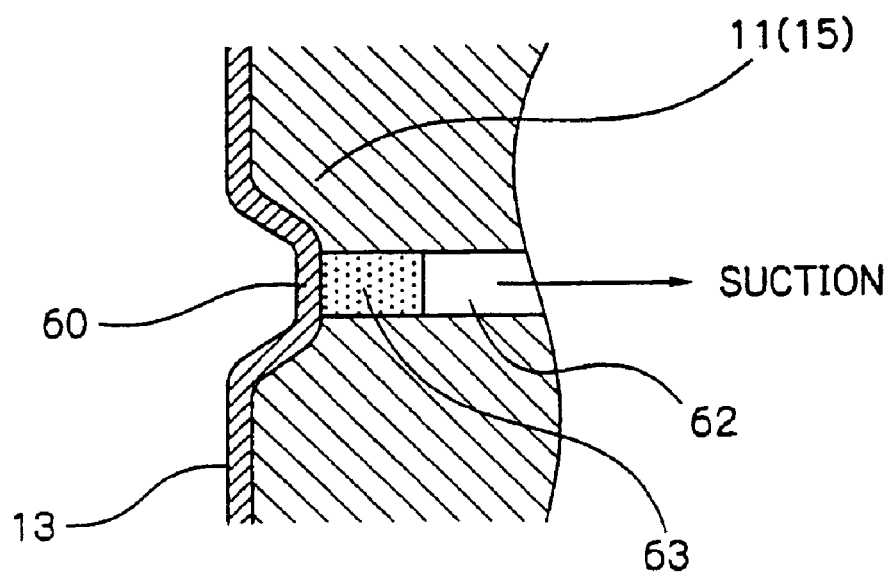
FIG. 20 is a fragmentary enlarged view of the mold shown in FIG. 10.

FIGS. 18 and 20 show a mold 11 configured to solve the problem stated above. As shown, the mold 11 includes a gas vent 62 communicating the recess 61 to the outside of the mold 11. More specifically, the gas vent 62 is open at the bottom of the recess 61. A sintered material or similar hard porous material 63 should preferably be positioned in the gas vent 62, substantially forming the bottom of the recess 61, i.e., part of the cavity surface. In this configuration, gas entered the recess 61 during blow molding is discharged to the outside via the gas vent 62. The toner bottle 13 can therefore be sufficiently stretched into the recess 61, so that the projection 60 can be formed with high molding accuracy.

The gas vent 62 may be open at the bottom of the recess 61 and at any suitable position adjoining it. The projection 60 may be positioned at the bottom of the toner bottle 13 or any suitable position adjoining it, if desired. Further, as shown in FIG. 20, a suction pump, for example, may be used to forcibly discharge the gas from the recess 61.

The gas vent 62 allows the projection 60 to be formed with high accuracy even when the projection 60 has a relatively small cross-sectional area and a relatively great height. Forcible exhaustion using, e.g., a suction pump further enhances this effect.

Figure 21:
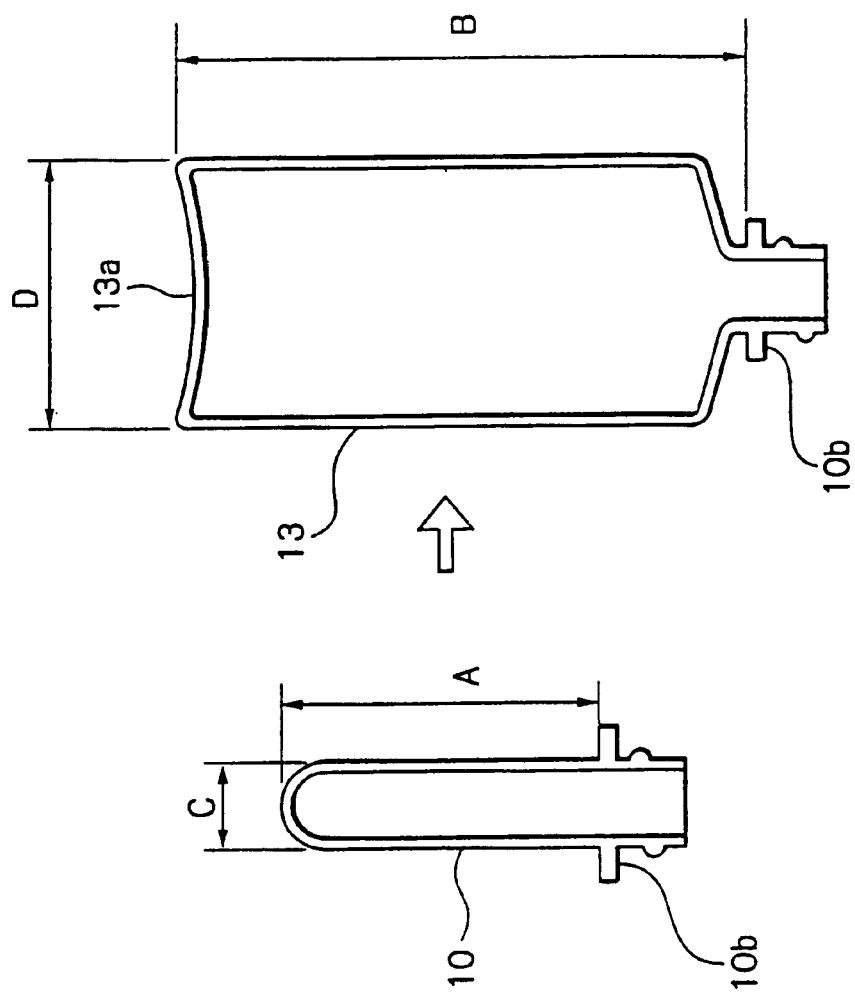
FIG. 21 shows the desirable dimensions of a preform used to produce a toner bottle by biaxial blow molding.

Generally, the toner bottle 13 has a relatively great height for its diameter. As shown in FIG. 21, to adequately stretch the entire preform 10 for implementing desirable transferability, it is preferable to limit the stretch of the preform 10 in the vertical and horizontal directions to 1.5 to 3 times. More specifically, as shown in FIG. 21, assume that the preform 10 has a diameter D and a height A, ant that the toner bottle 13 has a diameter D and a height D. Then, there should preferably hold a relation of $1.5C \leq D \leq 3.0$ and a relation of $1.5A \leq B \leq 3.0A$. In FIG. 21, the height A of the preform 10 and the height B of the toner bottle 13 each are represented by a distance between the flange 10b and the bottom. The heights A and B, of course, indicate the total height of the preform 10 and that of the toner bottle 13, respectively.

Figure 22:
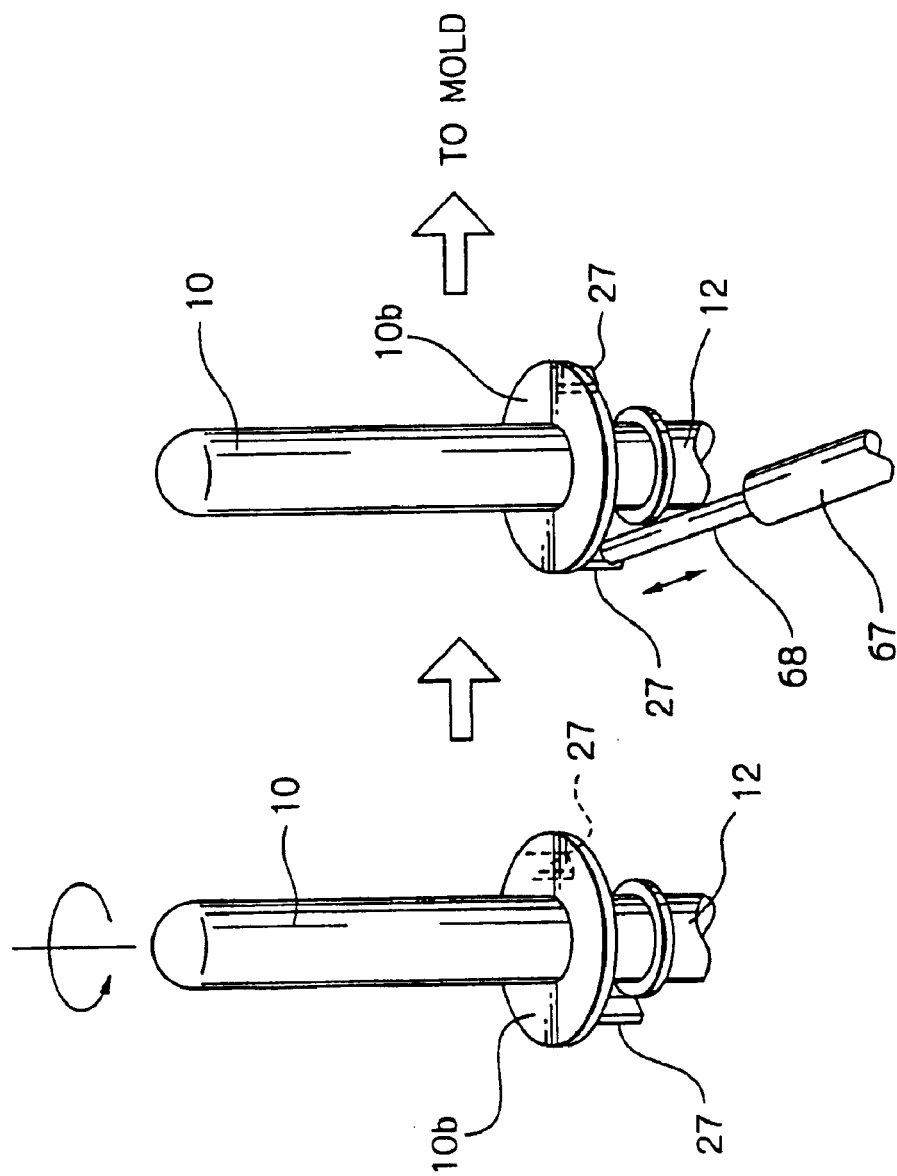
FIG. 22 is a view demonstrating how the angular position of a preform, which includes a flange, is adjusted before being introduced in a mold.

In the case of conventional biaxial, stretch blow molding, a preform is heated while in rotation, stopped at a suitable position, and then set in a mold. As shown in FIG. 22, assume that the support ring 10b of the toner bottle 13, FIG. 1A, is formed with lugs 27. Then, it is necessary to position the projections 27 relative to the mold. FIG. 22 shows a specific implementation for positioning the projections 27. At shown, after the preform 10 set on the blow pin or carrier pin 12 has been heated, a cylinder or similar drive means 67 causes a retractable pusher 68 to contact one of the lugs 27. The pusher 68 pushes the lug 27 until the preform 10 reaches a preselected angular position. The preform 10 is then introduced into the mold 11.

Figure 23:
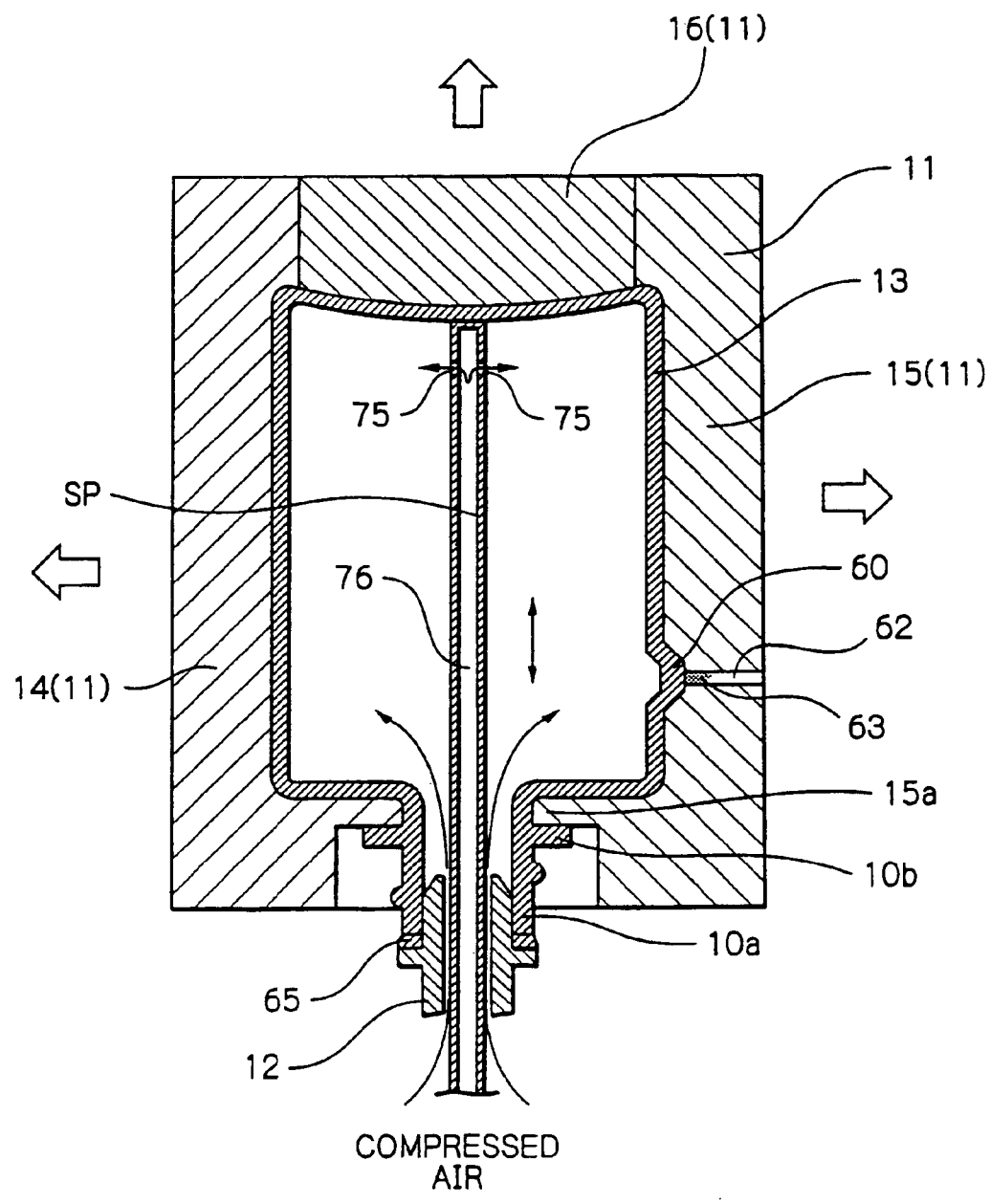
FIG. 23 shows another specific configuration of a stretch pin.

The implementation shown in FIG. 23 makes it needless to correct the angular position of the preform 10 at the time when the mold 11 is closed. When the pusher 68 pushes the preform 10, the carrier pin 12 should preferably be released from a drive source, not shown, assigned thereto so as to be freely rotatable.

FIG. 23 shows another specific configuration of the stretch pin SP for surely stretching the bottom of the toner bottle 13 during blow molding described with reference to FIG. 15B or 18. As shown, the stretch pin SP is implemented as a hollow rod whose tip is closed. Holes 75 are formed in the tip portion of tho stretch pin SP and preferably located at equally spaced positions along the circumference. Alternatively, the holes 75 may be formed in the intermediate portion of the stretch pin SP and located at equally spaced positions along the axis. During blow molding, auxiliary compressed air is blown into the toner bottle 13 via a passage 76 formed in the stretch pin SP and holes 75. Such auxiliary compressed air allows the bottom of the toner bottle 13 having a sophisticated configuration to be molded with high accuracy.

Figure 24A:
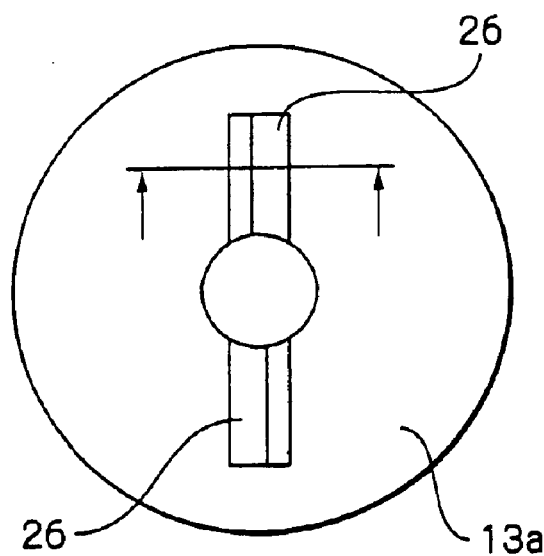
FIG. 24A is a front view showing ribs in accordance with the present invention that plays the role of drive transmitting means.
Figure 24B:
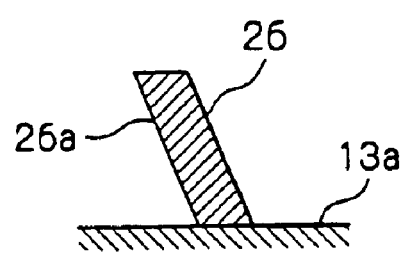
FIG. 24B is a section of the ribs.

It is a common practice to set a toner bottle in an electrophotographic image forming apparatus while causing a bottle holder to hold one end of the bottle. A rotary bracket supports the bottle holder and is rotated by a motor via a gear train, so that the toner bottle is rotated about its axis. This kind of drive system is applicable to the present invention. FIGS. 24A and 24B show drive means which may be substituted for or added to the conventional drive system. As shown, ribs 26 are formed on the bottom 13a of the toner bottle 13. The drive means is engaged with the ribs 26 for causing the toner bottle 13 to rotate. The ribs 26 serve to increase the rigidity of the bottom 13a at the same time.

The ribs 20 should preferably extend out from the bottom 13a or the toner bottle 13 with inclination. To form the ribs 26 perpendicular to or inclined relative to the bottom 13a, recesses corresponding to the ribs 26 may be formed in the mold surface of the bottom mold 16. However, the undercut portion 26a of each inclined rib 26 (see FIG. 24B) prevents the toner bottle 13 from being parted from the mold. This problem can be solved only if the bottom mold 16 is rotated while being moved away from the bottom 13a.

One or more lugs should preferably be formed on the bottom 13a of the toner bottle 13 in addition to the ribs 26. The drive means included in the image forming apparatus causes the toner bottle 13 to rotate with projections thereof engaging with the lugs. Specifically, in FIGS. 24A and 24B, the bottom 13a and joint move relative to each other and cause the toner bottle 13 to vibrate, so that the toner can be loosened and surely replenished. The lugs of the bottom 13a serve to increase the rigidity of the bottom 13a at the same time.

Figure 25:
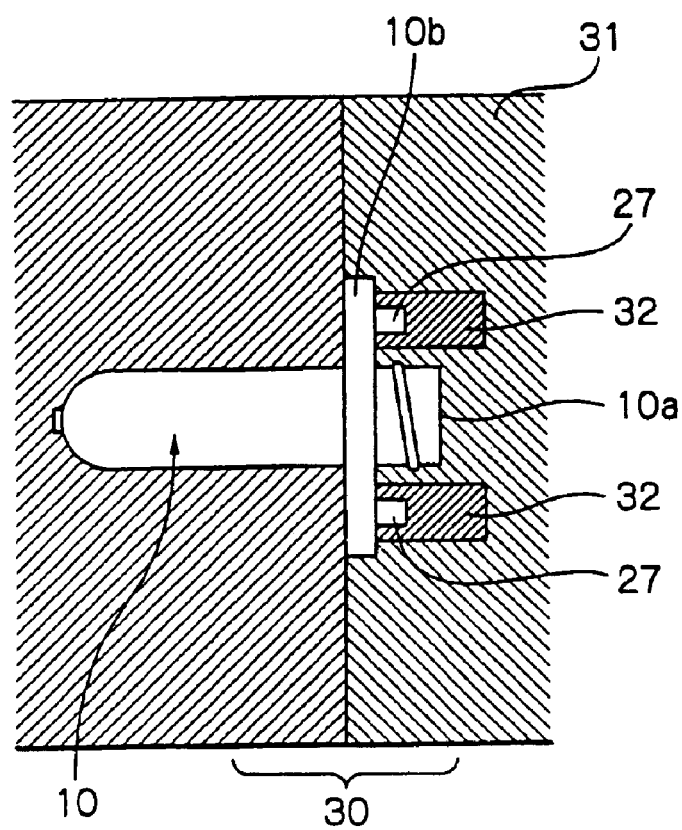
FIG. 25 is a view showing a mold for molding the preform.
Figure 26:
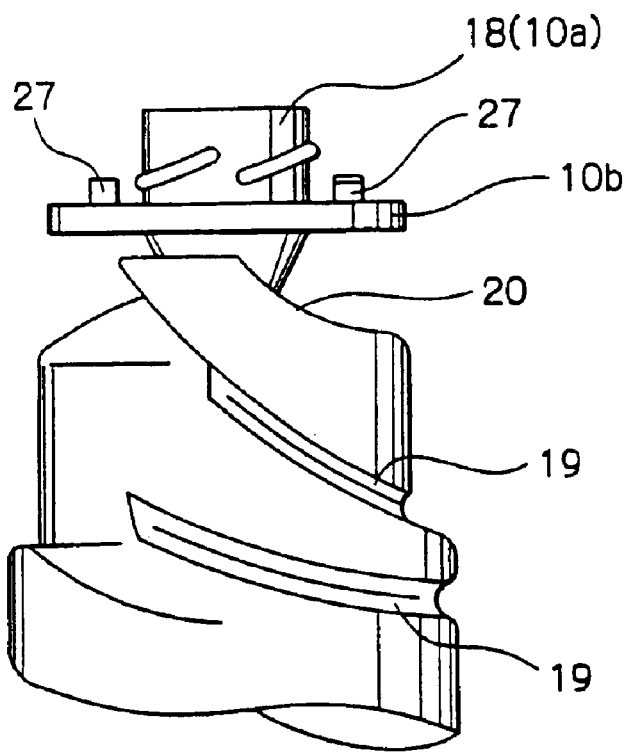
FIG. 26 is a side elevation of the mouth of a toner bottle in accordance with the present invention.
Figure 27:
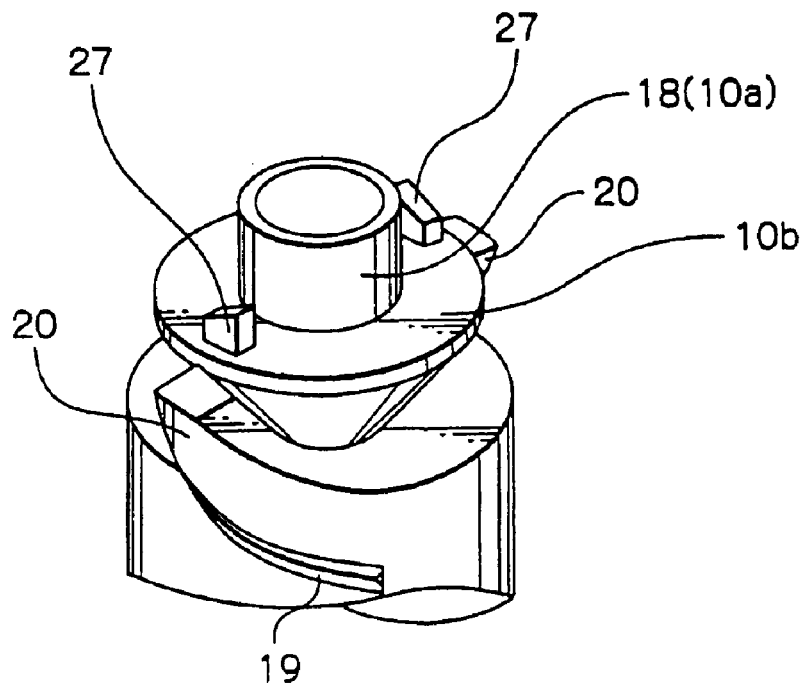
FIG. 27 is a perspective view of the mouth.

The support ring portion 10b of the preform 10 affixes the preform 10 to the mold 11 during biaxial, stretch blow molding, as stated previously. FIGS. 25, 26 and 27 show specific configurations of the lugs 27 formed on the support ring 10b and used to, e.g., display the content of the toner bottle 13. For this purpose, the lugs 27 may be arranged at particular positions indicative of the content or may be provided with particular dimensions indicative of the content. A shown in FIG. 25, to form the lugs 27, cavity inserts 32 are removably mounted on a core 31 that forms part of a mold 30 used to form the preform 10. A plurality of cavity inserts different in shape or position should preferably be prepared beforehand, so that different lugs 27 can share a single core 31. The support ring portion 10b with such lugs 27 prevents the toner bottle 13 storing inadequate toner from being mounted to the image forming apparatus.

Generally, a bottle holder included in an image forming apparatus holds a toner bottle. Ribs formed in the inner periphery of the bottle holder catch the ribs of the toner bottle and thereby cause the bottle holder and toner bottle to rotate together. If the lugs 27 are formed on the circular flange, then they are engaged with the ribs of the bottle holder and allow the bottle holder and toner bottle 13 to rotate together more effectively. In this sense, the lugs 27 are used for drive transmission.

The toner bottle of the present invention may store any kind of toner applicable to an electrophotographic image forming process. For example, the toner bottle may store either conventional toner or a mixture of toner and carrier; the toner may be magnetic or nonmagnetic. Toner may consist of styrene resin, polyester resin or similar binder resin, a coloring agent, and a charge control agent or similar additive. In the case of magnetic toner constituting a single-ingredient developer, a ferrite- or magnetite-based magnetic material is further added to the toner.

As for color, black toner, cyan toner, magenta toner and yellow toner are applied to a full-color image forming apparatus, and each is stored in a particular toner container.

The size of the toner container and the amount of toner to be stored therein are dependent on the image forming process.

A force with which a developing section pulls toner, which is used alone, should not be excessive or short. Such toner should preferably have true specific gravity ranging from 1.55 to 1.75. On the other hand, toner, which is combined with a carrier, should preferably have true specific gravity ranging from 1.1 to 1.3. Toner with such true specific gravity rapidly sinks when packed in the toner container of the present invention. This, coupled with the fact that the toner contains a minimum of air, allows the capacity or size of the container to be reduced.

Toner grains to be packed in the toner container of the present invention has a mean volume grain size of 4.0 $\mu$m to 12.0 $\mu$m, preferably 5.0 $\mu$m to 9.5 $\mu$m. Grain sizes below 4.0 m would bring about problems relating to image transfer and cleaning, which follow development. Grain sizes above 12.0 $\mu$m would make it difficult to maintain high resolution. For high definition, the mean grain size should preferably be 9.5 $\mu$m or below.

Figure 28:
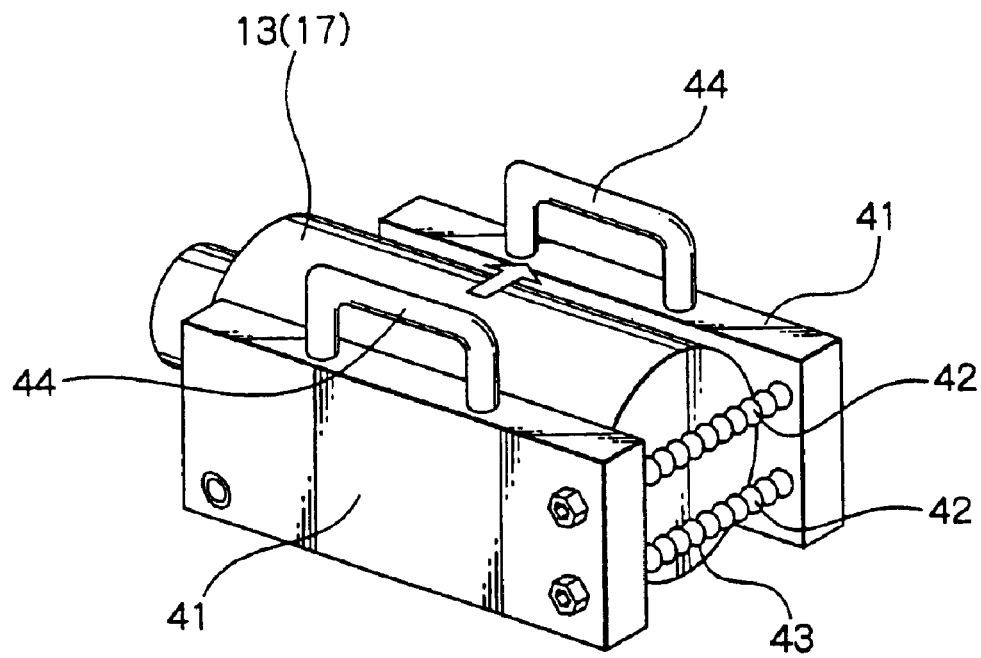
FIG. 28 is a perspective view showing a specific device for crushing a toner bottle in accordance with the present invention.
Figure 29:
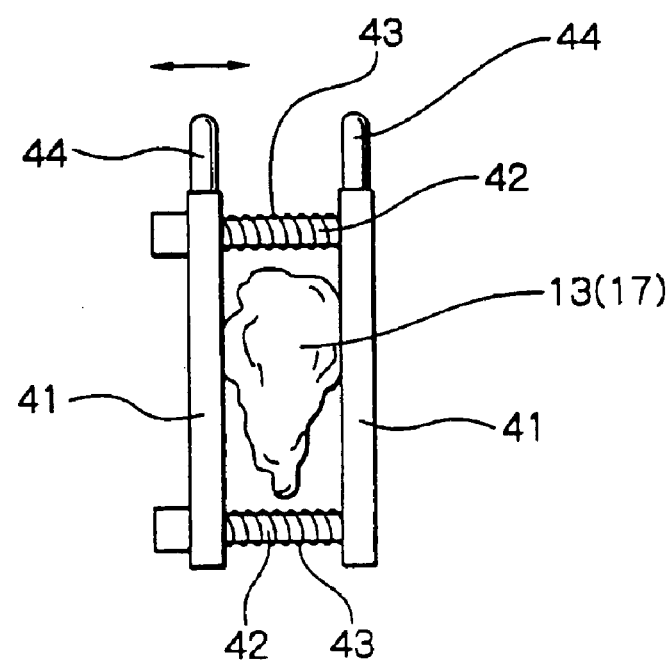
FIG. 29 is a side elevation of the crushing device.

FIGS. 28 and 29 show a specific device for crushing the toner bottle 13 run out of toner. As shown, the device includes a pair of side plates 41 spaced apart from each other. Guide pins 42 extend between the side plates 41 at three corners of the side plates 41. Springs 43 each are wound round one of the guide pins 42. The springs 43 constantly bias the side plates 41 away from each other. Grips 44 should preferably be affixed to the side plates 41, so that a person can hold the grips 44 and move the side plates 41 toward each other. More specifically, a person puts the empty bottle 13 in the space between the side plates 41 and then moves the side plates 41 toward each other, thereby crushing the body 17 of the bottle 13 in the radial direction. At this instant, the person does not have to touch the toner bottle 13 and is therefore free from smears.

The crushing device shown in FIGS. 28 and 29 and a drive source for driving it may be assembled together and mounted in the space of an image forming apparatus expected to receive the toner bottle 13. In such a case, the crushing device will automatically crush the toner bottle 13 when the bottle 13 runs out of toner. The crushing device may be so configured to crush the toner bottle 13 in the axial direction, if desired.

FIGS. 30 and 31 show another specific means for preventing toner from being sent out of the toner bottle 13 when the bottle 13 is crushed. As shown, an air vent 70 is formed in the lower portion of the circumferential wall of the toner bottle 13 by punching. A seal 72 implemented by unwoven cloth is affixed to the edges of the air vent 70 by adhesive 71. A peelable seal should preferably be adhered to the outer surface of the seal 72. When the toner bottle 13 is emptied, the peelable seal is removed from the seal 72. In this condition, the toner bottle 13 can be crushed without toner left therein being sent to the outside. The air vent 70 may alternatively be formed in any other suitable portion of the toner bottle, e.g., the bulged portion stated earlier or the bottom 13a.

Examples 1 through 6 of the present invention and comparative examples 1 through 3 will be described hereinafter. The toner bottle of the present invention is produced by biaxial, stretch blow molding that consists of the following steps (1) through (3).
(1) Injection Molding for Producing Preform
Polyester (PET; UNITIKA POLYESTER RESIN SA-1325P available from UNITIKA, LTD.) and high-density polyethylene (HDPE; GREX HD KB151A available from NIPPON POLYOLEFIN, LTD) were mixed together in a ratio PET/HDPE of 100/3. For this purpose, use was made of an injection molding machine 8S 170GN available from Toshiba Machine Co., Ltd. By conventional injection molding, there was produced a preform made up of the mouth portion 10a, support ring portion 10b, and stretch blow portion . The mouth portion 10a had an outside diameter of 28.5 mm and a wall thickness of 2.325 mm. The support ring portion 10b was spaced from the mouth portion 10a by 16 mm and had an outside diameter of 60.8 mm and a wall thickness of 2.0 mm. The stretch blow portion had a length of 135 mm and a wall thickness of 4.0 mm.

The mouth portion 10a and support ring portion 10b directly form the toner outlet and circular flange of a toner bottle or product, respectively. Three lugs A, FIG. 2, are formed integrally with the support ring portion 10b by injection molding. The lugs A are positioned on the support ring portion 10b at equally spaced locations along the circumference; the tips of the lugs A lie on a single circle. The outside diameter of the support ring portion 10b therefore includes the tips of the three lugs A. The outside diameter of the support ring portion 10b, which is 60.8 mm, is substantially the same as the outside diameter of a toner bottle. By the above procedure, nine preforms different in the circularity of the mouth were produced.

(2) Heating of Preform

The preforms each were supported by a blow pin and rotated while being heated at eight positions in the same manner as shown in FIG. 15A. A molding machine CSB-152/20M available from TAHARA CO., LTD. was rotated at a speed of 45 rpm while heating each preform at eight positions No. 1 through No. 8. The above molding machine has the maximum output of 39 kW. The following heater values (%) were assigned to the positions No. 1 through No. 8:

| No. 1 | No. 2 | No. 3 | No. 4 | No. 5 | No. 6 | No. 8 | No. 9 |
|---|---|---|---|---|---|---|---|
| 52.0 | 52.0 | 43.8 | 43.8 | 36.3 | 42.5 | 43.8 | 44.5 |

It is to be noted that a heater value refers to the ratio of an output assigned to each position to the maximum output of 39 kW; the greater the heater value, the higher the heating temperature. 52.0% (output of 20.2 kW) higher than the others is assigned to the positions No. 1 and No. 2 corresponding to the bulging portion.

(3) Stretch Blow Molding

Each preform softened by heating is left in the air for about 20 seconds and then shifted, before being fully cooled off, to a mold together with a carrier pin. The mold was configured to form the spiral rib shown in FIG. 4, reinforcing structure 89 shown in FIG. 7, reinforcing structure 99 shown in FIG. 8, and ribs on the bottom.

Subsequently, compressed air was sent into the preform received in the mold and supported by the carrier pin. As a result, the preform was strongly stretched in the circumferential direction except for its root portion. At the same time, a stretch rod or stretch pin stretched the preform in the axial direction. Consequently, the preform was biaxially stretched up to the bottom, forming a toner bottle made up of a mouth and a body.

More specifically, the stretch blow molding step was executed under the following conditions particular to the molding machine CSG 152/20M mentioned carrier. The preform supported by the carrier pin and softened by heat was affixed at a sealing air pressure of 0.7 MPa, so that air does not leak via the support portion during stretch blowing. In the mold, the stretch blow portion of the preform was extended radially outward. Compressed air was sent into the preform at a low pressure of 0.45 MPa for 1 second and then at a high pressure of 3.5 MPa to 3.8 MPa for 3.52 second. Subsequently, the preform was exhausted for 0.88 second.

In parallel with the sending of compressed air, the stretch rod or stretch pin was extended to a position of 220 mm at a speed of 40% and then to a position of 420.5 mm at a speed of 25%. These positions each are representative of a particular distance from the reference position of the molding machine. The maximum speed available with the molding machine is 100%. The delivery of compressed air at the low pressure of 0.45 MPa was effected when the stretch rod was extended to a position of 150 mm. To prevent the mold from opening due to compressed air, the mold was pressed by a mold air pressure of 1.7 MPa to 2.0 MPa.

A toner bottle produced by the steps (1) through (3) had the following dimensions. The mouth had an outside diameter of 28.5 mm and a wall thickness of 2.325 mm. The cylindrical wall of the mouth was 16 mm long between its toner outlet and the circular flange. The flange, including three lugs, had an outside diameter of 60.8 mm and a thickness of 2.0 mm. The body had a circumferential wall having a wall thickness of 0.35 mm, an outside diameter of 72 mm, and a length of 277.5 mm. Also, the body had a bottom having thickness of 1 mm up to a height of about 2.0 mm and 2.5 mm thick ribs. The toner bottle had a volume of 915 cc and consumed 0.063 kg of resin. The toner bottle included the bulging portion, spiral rib, reinforcing structure of FIG. 1, reinforcing structure of FIG. 9, and ribs on the bottom.

To determine the performance of nine toner bottles produced by the above procedure, coaxiality was measured by a specific method to be described later. A toner and carrier mixture, i.e., a two-ingredient type developer having a grain size of about 9.5 m was packed in each toner bottle in an amount of 360 g. The toner bottle was then mounted to a toner hopper unit included in an electrophotographic image forming apparatus Aficio 1022/1027 available from RICOH CO., LTD. The apparatus caused the toner bottle to repeatedly make one rotation and then stop for 10 seconds until the toner bottle became substantially empty. At this instant, how the toner flew about was observed and estimated with respect to five consecutive ranks:

Rank 1: over entire outer periphery of bottle

Rank 2: up to outer periphery of shoulder

Rank 3: only outer periphery of mouth

Rank 4: only around seal

Rank 5: nowhere

Rank 3 and above were determined to be free from the problems of the conventional toner. FIG. 32 lists the results of estimation. As show, the examples 1 through 6 with circularity of 0.7 and above cause a minimum of toner to fly about.

When the examples 1 through 6 each were mounted to the previously mentioned image forming apparatus, about 11,000 images could be output with an A4, 6% chart. This teaches that the examples 1 through 6 can desirably discharge toner stored therein.

A specific method of measuring coaxiality will be described hereinafter. First, the diameter of a circle formed by the positioning portion (outside diameter of the circular flange in the illustrative embodiment) is measured. Further, the outside diameter of a portion, which adjoins the bottom, where the entire circumferential surface (portion X herinafter) is smooth is measured. Then, a difference between one-half of the former diameter and that of the latter diameter is calculated (value A hereinafter).

Subsequently, the circular flange is placed on a horizontal V-block while the portion X is supported by a scriber mounted on a height gauge. Assuming that the height of the V block where the flange is positioned is zero, then the height of the height gauge, i.e., the height of the scriber is adjusted on the basis of the value A, thereby positioning the toner bottle horizontal.

Further, a dial gauge is positioned at the highest point of the toner outlet of the toner bottle, and then the bottle is slowly rotated by more than one rotation. A difference between the maximum and minimum values read by the dial gauge is determined to be coaxiality. The height gauge and scriber are equipment for precision measurement and usually used on a flat plate or V block. Specifically, the height gauge has a measuring terminal at its tip and measures the height or the position of an article in the form of a numerical value. The scriber is a metallic bar scribed such that its surface is flat when mounted to the height gauge.

Examples 7 through 9 each were identical in condition with the examples 1 through 6 except the following. The previously mentioned polyester SA-1325P was used alone as a raw material. The following heater values (%) were assigned to the positions No. 1 through No. 8;

| No. 1 | No. 2 | No. 3 | No. 4 | No. 5 | No. 6 | No. 7 | No. 8 |
|---|---|---|---|---|---|---|---|
| 54.6 | 54.6 | 46.0 | 46.0 | 38.1 | 44.6 | 46.0 | 46.7 |

As a result, three, substantially transparent toner bottles of substantially the same size as the examples 1 through 6 were produced. FIG. 33 shows the results of performance test executed in the same manner as with the examples 1 through 6. As FIG. 33 indicates, the results of performance test are also satisfactory.

Further, when the examples 7 through 9 each were mounted to the previously mentioned image forming apparatus, about 11,000 images could also be output with an A4, 6% chart. This teaches that the examples 7 through 9 can also desirably discharge toner stored therein.

As described above, the present invention successfully achieves all of the first to four objects thereof.

Various modifications will become possible for those skilled in the art after receiving the teachings of the present disclosure without departing from the scope thereof.

What is claimed is:

1. In a method of producing a toner bottle from a preform basically made up of a mouth portion, a support ring portion and a stretch blow portion by biaxial, stretch blow molding, said mouth portion comprising a toner outlet and a cylindrical wall,
   said mouth portion is formed by injection molding, and
   an outer circumference of said mouth portion has circularity of about 0.7 mm or below.

2. In a method of producing a toner bottle from a preform basically made up of a mouth portion, a support ring portion and a stretch blow portion by biaxial, stretch blow molding, said mouth portion comprising a toner outlet and a cylindrical wall,
   said mouth portion is formed by injection molding,
   an outer circumference of said mouth portion has circularity of about 0.7 mm or below, and
   said mouth portion and said support ring portion have coaxiality of about 1.0 mm or below.

3. In a method of producing a toner bottle from a preform basically made up of a mouth portion, a support ring portion and a stretch blow portion by biaxial, stretch blow molding, said mouth portion comprising a toner outlet and a cylindrical wall,
   said mouth portion is formed by injection molding,
   an outer circumference of said mouth portion has circularity of about 0.7 mm or below,
   a mold formed with a recess at which a gas vent communicated to an outside of said mold is open is used, and
   a gas is forcibly sucked out of said recess during molding to thereby form a projection on said toner bottle.

4. In a method of producing a toner bottle from a preform basically made up of a mouth portion, a support ring portion and a stretch blow portion by biaxial, stretch blow molding, said mouth portion comprising a toner outlet and a cylindrical wall, said mouth portion is formed by injection molding,
   an outer circumference of said mouth portion has circularity of about 0.7 mm or below, and
   a lug protrudes from said support ring portion for allowing, before said stretch blow portion softened by heat is introduced in a mold, adjusting means to adjust an angular position of said preform in engagement with said lug.

5. In a method of producing a toner bottle from a preform basically made up of a mouth portion, a support ring portion and a stretch blow portion by biaxial, stretch blow molding, said mouth portion comprising a toner outlet and a cylindrical wall,
   said mouth portion is formed by injection molding,
   an outer circumference of said mouth portion has circularity of about 0.7mm or below, and
   when said stretch blow portion is to be stretched in a mold, a hollow stretch pin is inserted into said preform via said mouth portion for pressing a bottom of said preform while, at the same time, compressed air is sent into said preform via a passage formed in said stretch pin and holes formed in a wall of said stretch pin.

6. In a preform basically made up of a mouth portion, a support ring portion and a stretch blow portion for producing a toner bottle by biaxial, stretch blow molding,
   said mouth portion comprises a toner outlet and a cylindrical wall, and is formed by injection molding, and
   an outer circumference of said mouth portion has circularity of about 0.7 mm or below.

7. The preform as claimed in claim 6, wherein a surface of said preform is at least partly roughened.

8. The toner bottle as claimed in claim 6, wherein said toner bottle is formed of a mixture of polyethylene terephthalate and polyethylene.

9. The toner bottle as claimed in claim 6, wherein said toner bottle is formed of a material reclaimed from used product collected on a market or wastes available from a factory.

10. The toner bottle as claimed in claim 9, wherein said toner bottle is formed of the material reclaimed and virgin resin of a same kind as said material.

11. In a preform basically made up of a mouth portion, a support ring portion and a stretch blow portion for producing a toner bottle by biaxial, stretch blow molding,
   said mouth portion comprises a toner outlet and a cylindrical wall, and is formed by injection molding, and
   an outer circumference of said mouth portion has circularity of about 0.7 mm or below while said mouth portion and said support ring portion have coaxiality of about 1.0 mm or below.

12. The preform as claimed in claim 11, wherein a surface of said preform is at least partly roughened.

13. The toner bottle as claimed in claim 11, wherein said toner bottle is formed of a mixture of polyethylene terephthalate and polyethylene.

14. The toner bottle as claimed in claim 11, wherein said toner bottle is formed of a material reclaimed from used product collected on a market or wastes available from a factory.

15. The toner bottle as claimed in claim 14, wherein said toner bottle is formed of the material reclaimed and virgin resin of a same kind as said material.

16. In a preform basically made up of a mouth portion, a support ring portion and a stretch blow portion for producing a toner bottle by biaxial, stretch blow molding, said mouth portion comprises a toner outlet and a cylindrical wall, and is formed by injection molding, an outer circumference of said mouth portion has circularity of about 0.7 mm or below, and said stretch blow portion is stretched by 1.5 to 3 times in a vertical and a horizontal direction.

17. The preform as claimed in claim 16, wherein a surface of said preform is at least partly roughened.

18. The toner bottle as claimed in claim 16, wherein said toner bottle is formed of a mixture of polyethylene terephthalate and polyethylene.

19. The toner bottle as claimed in claim 16, wherein said toner bottle is formed of a material reclaimed from used product collected on a market or wastes available from a factory.

20. The toner bottle as claimed in claim 19, wherein said toner bottle is formed of the material reclaimed and virgin resin of a same kind as said material.

21. A mold for forming by biaxial, stretch blow molding a toner bottle including a mouth and a projection for feeding toner to an electrophotographic apparatus, said mold comprising:

a recess for forming the projection; and a gas vent open at a bottom of said recess for communicating said recess to an outside of said mold, wherein an outer circumference of said mouth has circularity of about 0.7 mm or below.

22. A toner bottle comprising a material reclaimed from used products collected on a market or wastes available from a factory; and a mouth comprising a toner outlet and a cylindrical wall, wherein said mouth is formed by injection molding and an outer circumference of said toner outlet has circularity of 0.7 mm or below.

23. The toner bottle as claimed in claim 22, wherein said material is formed of polyethylene terephthalate.

24. The toner bottle as claimed in claim 22, wherein said material is formed of a mixture of polyethylene terephthalate and polyethylene.

25. The toner bottle as claimed in claim 22, wherein said toner bottle is formed of said material reclaimed and virgin resin of a same kind as said material.

26. The toner bottle as claimed in claim 22, wherein said toner bottle is formed of said material reclaimed and a plasticizer.

* * * * *